US010976579B2

(12) United States Patent
Ziemkiewicz et al.

(10) Patent No.: US 10,976,579 B2
(45) Date of Patent: Apr. 13, 2021

(54) LIQUID CRYSTAL WAVEGUIDE WITH ACTIVE INCOUPLING

(71) Applicant: Analog Devices, Inc., Norwood, MA (US)

(72) Inventors: Michael Ziemkiewicz, Lakewood, CO (US); Scott Robert Davis, Denver, CO (US); Scott D. Rommel, Lakewood, CO (US); Benjamin Luey, Denver, CO (US); Michael Howard Anderson, Lyons, CO (US); Derek Gann, Denver, CO (US)

(73) Assignee: Analog Devices, Inc., Norwood, MA (US)

( * ) Notice: Subject to any disclaimer, the term of this patent is extended or adjusted under 35 U.S.C. 154(b) by 170 days.

(21) Appl. No.: 16/059,731

(22) Filed: Aug. 9, 2018

(65) Prior Publication Data

US 2020/0050034 A1    Feb. 13, 2020

(51) Int. Cl.
  *G02F 1/13* (2006.01)
  *G02F 1/01* (2006.01)
(52) U.S. Cl.
  CPC ............ *G02F 1/1326* (2013.01); *G02F 1/011* (2013.01)
(58) Field of Classification Search
  CPC ................................ G02F 1/1326; G02F 1/011
  See application file for complete search history.

(56) References Cited

U.S. PATENT DOCUMENTS

| 3,447,855 A | 6/1969 | Skinner |
| 3,458,247 A | 7/1969 | Buhrer et al. |
| 3,485,553 A | 12/1969 | Lee |
| 3,510,199 A | 5/1970 | Lee |

(Continued)

FOREIGN PATENT DOCUMENTS

| WO | WO-2005069918 A2 | 8/2005 |
| WO | WO-2005069939 A3 | 8/2005 |
| WO | WO-2020033264 A1 | 2/2020 |

OTHER PUBLICATIONS

"U.S. Appl. No. 15/466,822, Examiner Interview Summary dated Mar. 21, 2018", 3 pgs.

(Continued)

*Primary Examiner* — Thanh Nhan P Nguyen
(74) *Attorney, Agent, or Firm* — Schwegman Lundberg & Woessner, P.A.

(57) ABSTRACT

A liquid crystal waveguide (LCW) can include actively controlled incoupling of light into a LCW, such as by using a voltage-controlled electrode to actively vary a property of an LC material arranged to affect the incoupling of light into the LCW. Actively varying light incoupling into the LCW can be used, for example, such as for calibration or compensation or to provide closed-loop feedback such as to stabilize the amount of light into the LCW while accommodating or reducing sensitivity of the LCW to variations in one or more of: input laser light incidence angle, input laser wavelength, LCW or input laser temperature, input laser optical power level, or the like. This can advantageously help improve or maximize light incoupling efficiency, which (Continued)

can improve performance and robustness of the LCW under actual operating conditions. The LCW can be used for, among other things, beamsteering in in-plane and out-of-plane directions.

24 Claims, 12 Drawing Sheets

(56) References Cited

U.S. PATENT DOCUMENTS

| | | | |
|---|---|---|---|
| 4,721,352 | A | 1/1988 | Sorin et al. |
| 5,347,377 | A | 9/1994 | Revelli, Jr. et al. |
| 5,388,169 | A | 2/1995 | Kobayashi et al. |
| 5,486,940 | A | 1/1996 | Fergason et al. |
| 5,802,223 | A | 9/1998 | Nashimoto |
| 5,920,662 | A | 7/1999 | Hinkov |
| 6,154,591 | A | 11/2000 | Kershaw |
| 6,400,855 | B1 | 6/2002 | Li et al. |
| 6,470,105 | B1 | 10/2002 | Baney et al. |
| 6,985,373 | B2 | 1/2006 | Tsu |
| 6,999,156 | B2 | 2/2006 | Chou et al. |
| 7,027,670 | B2 | 4/2006 | Aoki |
| 7,146,070 | B1 | 12/2006 | Li et al. |
| 7,233,261 | B2 | 6/2007 | Nunnally et al. |
| 7,315,665 | B1 | 1/2008 | Anderson |
| 7,570,320 | B1 | 8/2009 | Anderson et al. |
| 7,720,116 | B2 | 5/2010 | Anderson et al. |
| 8,311,372 | B2 | 11/2012 | Anderson et al. |
| 8,380,025 | B2 | 2/2013 | Anderson et al. |
| 8,463,080 | B1 | 6/2013 | Anderson et al. |
| 8,860,897 | B1 | 10/2014 | Anderson et al. |
| 8,989,523 | B2 | 3/2015 | Anderson et al. |
| 8,995,038 | B1 | 3/2015 | Anderson et al. |
| 9,033,888 | B2 | 5/2015 | Brown et al. |
| 9,366,938 | B1* | 6/2016 | Anderson ............... G02F 1/295 |
| 9,730,676 | B2 | 8/2017 | Brown et al. |
| 9,829,766 | B2 | 11/2017 | Anderson et al. |
| 9,880,443 | B2 | 1/2018 | Anderson |
| 9,885,892 | B2 | 2/2018 | Anderson et al. |
| 2002/0071646 | A1 | 6/2002 | Eggleton et al. |
| 2002/0114556 | A1 | 8/2002 | Kato et al. |
| 2002/0140879 | A1 | 10/2002 | Fujieda |
| 2003/0118262 | A1 | 6/2003 | Aoki et al. |
| 2003/0219197 | A1 | 11/2003 | Kawamoto |
| 2003/0231279 | A1 | 12/2003 | Wessel et al. |
| 2004/0264229 | A1 | 12/2004 | Tsu |
| 2005/0123228 | A1 | 6/2005 | Nishizawa et al. |
| 2005/0123243 | A1 | 6/2005 | Steckl et al. |
| 2005/0140837 | A1 | 6/2005 | Crawford et al. |
| 2005/0271325 | A1 | 12/2005 | Anderson et al. |
| 2006/0072186 | A1 | 4/2006 | Nunnally et al. |
| 2008/0008413 | A1 | 1/2008 | Anderson et al. |
| 2008/0008414 | A1 | 1/2008 | Anderson et al. |
| 2009/0015904 | A1 | 1/2009 | Okayama |
| 2010/0314027 | A1 | 12/2010 | Blauvelt et al. |
| 2011/0063604 | A1 | 3/2011 | Hamre et al. |
| 2012/0269478 | A1 | 10/2012 | Anderson et al. |
| 2012/0296215 | A1 | 11/2012 | Brown et al. |
| 2013/0258452 | A1 | 10/2013 | Kamiguchi et al. |
| 2013/0259417 | A1 | 10/2013 | Kamiguchi et al. |
| 2015/0366542 | A1 | 12/2015 | Brown et al. |
| 2017/0023753 | A1 | 1/2017 | Vail et al. |
| 2017/0038590 | A1 | 2/2017 | Jepsen |
| 2017/0038591 | A1 | 2/2017 | Jepsen |
| 2017/0039904 | A1 | 2/2017 | Jepsen |
| 2017/0039906 | A1 | 2/2017 | Jepsen |
| 2017/0039907 | A1 | 2/2017 | Jepsen |
| 2017/0039960 | A1 | 2/2017 | Jepsen |
| 2017/0059960 | A1 | 3/2017 | Shi et al. |
| 2017/0115519 | A1 | 4/2017 | Shi et al. |
| 2017/0153530 | A1 | 6/2017 | Anderson et al. |
| 2017/0192264 | A1 | 7/2017 | Anderson et al. |
| 2017/0212404 | A1 | 7/2017 | Anderson et al. |

OTHER PUBLICATIONS

"U.S. Appl. No. 15/466,822, Non Final Office Action dated Nov. 3, 2017", 31 pgs.
"U.S. Appl. No. 15/466,822, Response filed May 3, 2018 to Non Final Office Action dated Nov. 3, 2017", 45 pgs.
"U.S. Appl. No. 15/479,999, Amendment Under 37 CFR 1.312 Filed Apr. 27, 2018", 10 pgs.
"U.S. Appl. No. 15/479,999, Final Office Action dated Dec. 18, 2017", 12 pgs.
"U.S. Appl. No. 15/479,999, Non Final Office Action dated Aug. 28, 2017", 15 pgs.
"U.S. Appl. No. 15/479,999, Notice of Allowability dated May 31, 2018", 4 pgs.
"U.S. Appl. No. 15/479,999, Notice of Allowance dated Jan. 30, 2018", 12 pgs.
"U.S. Appl. No. 15/479,999, PTO Response to Rule 312 Communication dated May 11, 2018", 3 pgs.
"U.S. Appl. No. 15/479,999, Response filed Jan. 5, 2018 to Final Office Action dated Dec. 18, 2017", 9 pgs.
"U.S. Appl. No. 15/479,999, Response filed Nov. 28, 2017 to Non Final Office Action dated Aug. 28, 2017", 13 pgs.
"U.S. Appl. No. 15/678,741, Notice of Allowance dated May 25, 2018", 16 pgs.
"Move Your Light Not Your Mirrors: A New Analog, EO Beamsteerer With Unprecedented Performance", (Sep. 8, 2008), 2 pages.
"Vescent_New_SPIE_Newsroom", (Mar. 23, 2011), 4 pages.
"Vescent_SPIE_Newsroom", (Dec. 21, 20017), 5 pages.
Chao, Tien-Hsin, et al., "Compact liquid crystal waveguide based Fourier transform spectrometer for in-situ and remote gas and chemical sensing", Proc. of SPIE vol. 6977 69770P-10, (Mar. 17, 2008), 12 pages.
Chao, Tien-Hsin, et al., "Monolithic liquid crystal waveguide Fourier transform spectrometer for gas species sensing", Proc. of SPIE vol. 8055 805506-1, (Apr. 26, 2011), 14 pages.
Davis, S P, et al., "Fourier Transform Spectrometry", SPIE_LCWFTSnewsroom_final, (Jun. 19, 2008), 3 pages.
Davis, Scott R., et al., "A lightweight, rugged, solid state laser radar system enabled by nonmechanical electro-optic beam steerers", Proc. of SPIE vol. 9832 98320K-1, (May 13, 2016), 12 pages.
Davis, Scott R., et al., "A new electro-optic waveguide architecture and the unprecedented devices it enables", Proc. of SPIE vol. 6975 697503-1, (Mar. 24, 2008), 13 pages.
Davis, Scott R., et al., "A new generation of previously unrealizable photonic devices as enabled by a unique electro-optic waveguide architecture", Proc. of SPIE vol. 7050 7050051, (Aug. 27, 2008), 16 pages.
Davis, Scott R., et al., "A new photonics technology platform and its applicability for coded aperture techniques", Proc. of SPIE vol. 8165 81651E-1, (Sep. 13, 2011), 10 pages.
Davis, Scott R., et al., "Analog, non-mechanical beamsteerer with 80 degree field of regard", Proc. of SPIE vol. 6971 69710G-1, (Mar. 24, 2008), 12 pages.
Davis, Scott R., et al., "Large-Angle Electro-Optic Laser Scanner", (Mar. 31, 2008), 2 pages.
Davis, Scott R., et al., "Liquid crystal clad waveguide laser scanner and waveguide amplifier for LADAR and sensing applications", Proc. of SPIE vol. 9365 93650N-1, (Feb. 27, 2015), 13 pages.
Davis, Scott R., et al., "Liquid Crystal Waveguides: New Devices Enabled by >1000 Waves of Optical Phase Control", SPIE 2010, (Jul. 1, 2010), 14 pages.
Davis, Scott R., et al., "New electro-optic laser scanners for small-sat to ground laser communication links", Proc. of SPIE vol. 8739 87390H-1, (May 21, 2013), 11 pages.
Davis, Scott R., et al., "New Wide Angle Electro-Optic Laser Scanners Enable Optical Sensors on Previously Inaccessible Platforms", AIWB Laser Applications, Imaging and Applied Optics: OSA Optics & Photonics Congress, Toronto CA, Jul. 10-14, 2011, (Jul. 10, 2011), 3 pages.
Davis, Scott R., et al., "Next-generation photonic true time delay devices as enabled by a new electro-optic architecture", Proc. of SPIE vol. 8739 87390G-1, (May 21, 2013), 16 pages.
Davis, Scott, "Vescent Power Handling", (Jun. 15, 2018), 2 pages.

(56) References Cited

OTHER PUBLICATIONS

Farca, George, et al., "An Analog, Non-Mechanical Beam-Steerer with an 80 Degree Field of Regard for LIDAR Applications", Vescent Photonics ILMF 2008 Presentation, (Jan. 30, 2008), 11 pages.
Frantz, Jesse A., et al., "Non-mechanical beam steering in the mid-wave infrared", Proc. of SPIE vol. 10181 101810X-1, (May 11, 2017), 8 pages.
Keller, Sean D., et al., "Emerging liquid crystal waveguide technology for low SWaP active short-wave infrared imagers", Proc. of SPIE vol. 9384 93840M-1, (Mar. 11, 2015), 10 pages.
Luey, Ben, et al., "A Lightweight, Cost-Efficient, Solid-State Lidar System Utilizing Liquid Crystal Technology for Laser Beam Steering for Advanced Driver Assistance", (Apr. 1, 2017), 9 pages.
Ura, Shogo, et al., "An Integrated-Optic Disk Pickup Device", Journal of Lightwave Technology, vol. LT-4, No. 7, Jul. 1986, (Jul. 1, 1986), 913-918.
Ziemkiewicz, Michael, et al., "Laser-based satellite communication systems stabilized by nonmechanical electro-optic scanners", Proc. of SPIE vol. 9828 982808-1, (May 17, 2016), 13 pages.
"International Application Serial No. PCT US2019/044903, International Search Report dated Oct. 31, 2019", 2 pgs.
"International Application Serial No. PCT US2019/044903, Written Opinion dated Oct. 31, 2019", 4 pgs.

\* cited by examiner

LIQUID CRYSTAL WAVEGUIDE WITH ACTIVE INCOUPLING

TECHNICAL FIELD

This document pertains generally, but not by way of limitation, to optoelectronics, and particularly but not by way of limitation to a liquid crystal waveguide with active light incoupling.

BACKGROUND

A liquid crystal waveguide (LCW) can be used as a beamsteerer for guiding and steering light, such as can be received as an input light beam from a laser. A liquid crystal (LC) material can be used for steering light within or leaving the LCW, such as by applying a voltage to vary a property of the LC material in response to the voltage for steering the light.

SUMMARY

The present inventors have recognized, among other things, that it can be desirable to actively adjust the incoupling of light into a LCW, such as by using a voltage-controlled electrode to actively vary a property of an LC material that is arranged to affect the incoupling of light into the LCW. Actively varying light incoupling into the LCW can be used, for example, such as for calibration or to provide closed-loop feedback such as to stabilize the amount of light into the LCW while accommodating or reducing sensitivity of the LCW to variations in one or more of: input laser light incidence angle, input laser wavelength, LCW or input laser temperature, input laser optical power level, or the like.

A numbered list of some non-limiting examples of aspects of the present subject matter is provided below.

Aspect 1 can include or use subject matter (such as an apparatus, a system, a device, a method, a means for performing acts, or a device readable medium including instructions that, when performed by the device, can cause the device to perform acts, or an article of manufacture) such as can include or use a Liquid Crystal Waveguide (LCW) system with controlled incoupling of light. The LCW system can include or use a Liquid Crystal Waveguide (LCW). The LCW can include or use a core, arranged to receive light provided at a light input for communication toward a light output; a light-incoupling control electrode; and a Liquid Crystal (LC) material, arranged to be controlled by a control signal applied to the light-incoupling control electrode to vary a property of the LC material to adjust an incoupling of light into the core of the LCW.

Aspect 2 can include or use, or can optionally be combined with the subject matter of Aspect 1, to optionally include or use a controller circuit. The controller circuit can be configured to vary the control signal applied to the light-incoupling control electrode such as to vary a property of the LC material such as to adjust an incoupling of light into the core of the LCW such as to accommodate a variation in at least one of input laser light incidence angle, input laser wavelength, input laser position, LCW or input laser temperature, or input laser optical power level.

Aspect 3 can include or use, or can optionally be combined with the subject matter of one or more of Aspects 1 or 2 to optionally include or use a light detector sensor. The light detector sensor can be coupled to an input of the controller circuit such as to apply the control signal to the light-incoupling control electrode such as to adjust incoupling of light into the core such as in response to light detected by the light detector sensor.

Aspect 4 can include or use, or can optionally be combined with the subject matter of one or more of Aspects 1 through 3 to optionally include or use a Liquid Crystal Waveguide (LCW) that can include a substrate, such as can be arranged to receive light for input into the LCW. The light detector sensor can be arranged to detect light input into the substrate without being received by the core.

Aspect 5 can include or use, or can optionally be combined with the subject matter of one or more of Aspects 1 through 4 to optionally include or use a light detector sensor that can be arranged to detect light guided and output by the LCW waveguide.

Aspect 6 can include or use, or can optionally be combined with the subject matter of one or more of Aspects 1 through 5 to optionally include or use a Liquid Crystal Waveguide (LCW) that can include a subcladding that can be arranged with respect to the core to tend to confine light within the core for communication toward the light output. At least one of the subcladding or the LC material can include a tapered cross-section region such as providing a path via which light input from the substrate passes in being communicated to the core.

Aspect 7 can include or use, or can optionally be combined with the subject matter of one or more of Aspects 1 through 6 to optionally include or use a Liquid Crystal Waveguide (LCW) that can include at least one of: a substrate, which can be arranged to receive light for input into the LCW, or a subcladding, which can be arranged with respect to the core to tend to confine light within the core for communication toward the light output. The LCW system can include a step-coupler that can include an input region that can provide higher relative efficiency incoupling of light into the core. A downstream optical isolation region along a portion of the core can tend to confine light in the core for communication toward the LCW output. The optical isolation region can include a lower relative efficiency incoupling than the input region.

Aspect 8 can include or use, or can optionally be combined with the subject matter of one or more of Aspects 1 through 7 to optionally include or use the optical isolation region being provided by a subcladding region such as having a larger cross-section than a subcladding in the input region of the step-coupler.

Aspect 9 can include or use, or can optionally be combined with the subject matter of one or more of Aspects 1 through 8 to optionally include or use the optical isolation region being provided by a fill region defined by the substrate. The fill region can include a lower index of refraction material than a material of the substrate.

Aspect 10 can include or use, or can optionally be combined with the subject matter of one or more of Aspects 1 through 9 to optionally include or use a diffractive grating that can be located to provide at least partially diffractive incoupling of light into the core.

Aspect 11 can include or use, or can optionally be combined with the subject matter of one or more of Aspects 1 through 10 to optionally include or use a controller circuit, which can be configured to vary the control signal applied to the light-incoupling control electrode such as to vary a property of the LC material such as to adjust an incoupling of light into the core of the LCW. A temperature sensor can be coupled to an input of the controller circuit such as to apply the control signal to the light-incoupling control electrode such as to adjust incoupling of light into the core such as in response to an indication of temperature detected by the temperature sensor.

Aspect 12 can include or use, or can optionally be combined with the subject matter of one or more of Aspects 1 through 11 to optionally include or use a controller circuit, which can be configured to vary the control signal applied to the light-incoupling control electrode such as to vary a property of the LC material such as to adjust an incoupling of light into the core of the LCW. The controller circuit can be configured for dithering light incoupled to the core such as for providing a signature to a lock-in amplifier.

Aspect 13 can include or use, or can optionally be combined with the subject matter of one or more of Aspects 1 through 12 to optionally include or use the Liquid Crystal Waveguide (LCW), which can further comprise a substrate, which can be arranged to receive light for input into the LCW. A subcladding can be arranged with respect to the core such as to tend to confine light within the core for communication toward the light output.

Aspect 14 can include or use subject matter (such as an apparatus, a system, a device, a method, a means for performing acts, or a device readable medium including instructions that, when performed by the device, can cause the device to perform acts, or an article of manufacture), or can be combined with the subject matter of any one or more of Aspects 1 through 13, such as to include or use a method of using a Liquid Crystal Waveguide (LCW) and controlling incoupling of light into the LCW. This can include receiving light for input into the LCW. It can also include controlling incoupling of light into the LCW, such as including by applying a control signal such as to vary a property of a Liquid Crystal (LC) material such as to adjust an incoupling of light the LCW.

Aspect 15 can include or use, or can optionally be combined with the subject matter of one or more of Aspects 1 through 14 to optionally include or use detecting an indication of light incoupling into the core. The indication of light incoupling into the core can be used as a feedback signal for the controlling incoupling of light into a core of the LCW.

Aspect 16 can include or use, or can optionally be combined with the subject matter of one or more of Aspects 1 through 15 to optionally include or use the detecting the indication of light incoupling into the core including detecting a light reflected without being incoupled into the core.

Aspect 17 can include or use, or can optionally be combined with the subject matter of one or more of Aspects 1 through 16 to optionally include or use detecting the indication of light incoupling into the core including detecting an indication of light output from the LCW.

Aspect 18 can include or use, or can optionally be combined with the subject matter of one or more of Aspects 1 through 17 to optionally include or use adjusting at least one of a laser wavelength, power, or incidence angle onto the LCW in response to the indication of light incoupling into the core.

Aspect 19 can include or use, or can optionally be combined with the subject matter of one or more of Aspects 1 through 18 to optionally include or use controlling incoupling of light into a core of the LCW including controlling a path through a tapered cross-sectional material.

Aspect 20 can include or use, or can optionally be combined with the subject matter of one or more of Aspects 1 through 19 to optionally include or use controlling incoupling of light into the core including varying a control signal applied to a light-incoupling control electrode such as to vary a property of the LC material such as to adjust an incoupling of light into the core of the LCW such as to accommodate a variation in at least one of input laser light incidence angle, input laser wavelength, LCW or input laser temperature, or input laser optical power level.

Aspect 21 can include or use, or can optionally be combined with the subject matter of one or more of Aspects 1 through 20 to optionally include or use controlling incoupling of light into the core such as in response to a detected temperature of at least one of the LCW or the laser.

Aspect 22 can include or use, or can optionally be combined with the subject matter of one or more of Aspects 1 through 21 to optionally include or use controlling incoupling of light into the core including dithering light power through the LCW.

Each of these non-limiting examples or aspects can stand on its own, or can be combined in various permutations or combinations with one or more of the other examples or aspects. This overview is intended to provide an overview of subject matter of the present patent application. It is not intended to provide an exclusive or exhaustive explanation of the invention. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

A liquid crystal waveguide (LCW) can be used as a beamsteerer for guiding and steering light, such as can be received as an input light beam from a laser. A liquid crystal (LC) material can be used for steering light within or leaving the LCW, such as by applying a voltage to vary a property of the LC material in response to the voltage for steering the light.

The present inventors have recognized, among other things, that it can be desirable to actively adjust the incoupling of light into a LCW, such as by using a voltage-controlled electrode to actively vary a property of an LC material that is arranged to affect the incoupling of light into the LCW. Actively varying light incoupling into the LCW can be used, for example, such as for calibration or compensation or to provide closed-loop feedback such as to stabilize the amount of light into the LCW while accommodating or reducing sensitivity of the LCW to variations in one or more of: input laser light incidence angle, input laser wavelength, LCW or input laser temperature, input laser optical power level, or the like. This can advantageously help improve or maximize light incoupling efficiency, which can improve performance and robustness of the LCW under actual operating conditions. It can also be used to compensate for misalignment in the manufacturing process. For example, if the laser or LCW is mounted so that their relative angle is incorrect, active coupling can be used to correct this error.

Some illustrative examples of LCWs are described in: (1) U.S. Pat. Nos. 9,366,938, 9,885,892, 9,829,766, and 9,880,443; (2) U.S. Pat. Nos. 8,311,372 and 8,380,025; (3) U.S. Pat. No. 8,860,897; (4) U.S. Pat. No. 8,463,080; and (5) U.S. Pat. No. 7,570,320, all of which are incorporated herein by reference in their entireties, including for their description of LCWs and uses such as for beamsteering of light, including in-plane and out-of-plane beamsteering. This document explains, among other things, techniques for controlling light incoupling into an LCW core, such as can be applied to the LCWs and techniques described and shown in this document, or to those described and shown in the above-incorporated documents.

Figure 1:
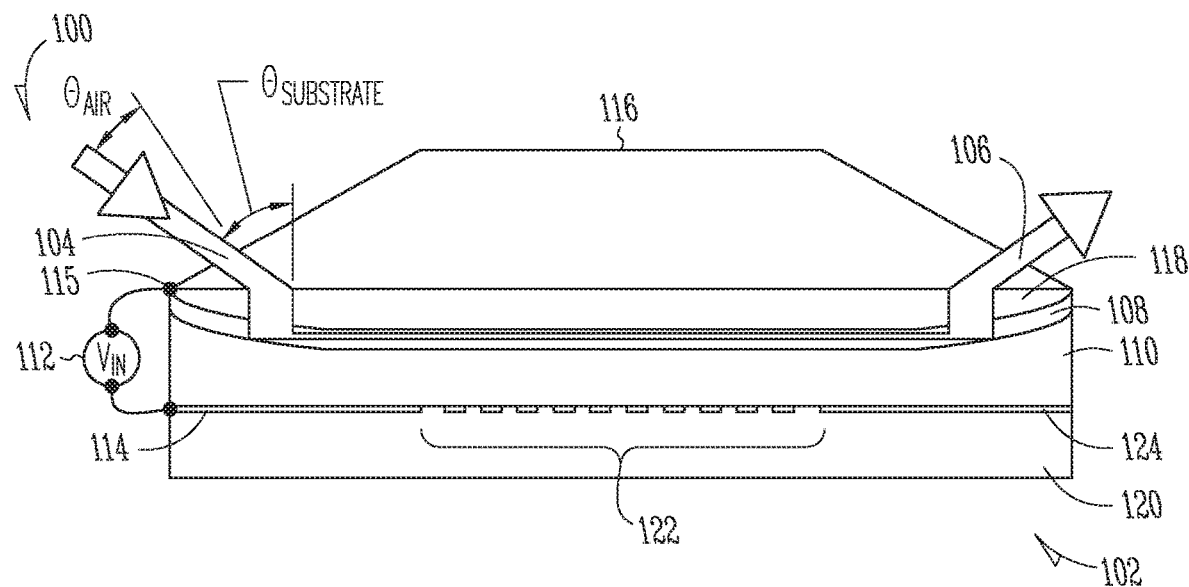
FIG. 1 shows an example of an active incoupling control stage at the input to a liquid crystal waveguide with a tapered subcladding that forms the incoupling region.

FIG. 1 shows a cross-sectional view of an example of portions of a Liquid Crystal Waveguide (LCW) system 100. The LCW system 100 can include an liquid crystal waveguide (LCW) 102. The waveguide 102 can include an optical light input 104 to receive an input light beam and an optical light output 106 to provide an output light beam. An optical waveguide core 108 can extend between an incoupling region of the waveguide 102 and an outcoupling region of the waveguide 102. The core 108 can be arranged to receive light provided at a light input 104 for communication through the waveguide 102 to the light output 106. The waveguide 102 can include a Liquid Crystal (LC) material 110, which can be arranged to be controlled by a control signal (Vin) 112 that can be applied to a light incoupling control electrode 114 to vary a property of the LC material 110 to adjust an incoupling of light into the core 108 of the waveguide 102.

A substrate 116 can optionally be included, such as for providing mechanical stability to the core 108 or to one or more other layers. An optically transparent (to the wavelengths of interest) substrate 116 can optionally be included, such as for incoupling light from the input beam at the light input 104, for outcoupling of light provided by the output beam at the light output 106, or both, such as at an oblique-angled facet of the substrate 116 relative to a plane of the waveguide 102 such as a plane defined by a plane of an intermediate portion of the core 108 of the waveguide 102. A subcladding 118 layer can also optionally be included in the waveguide 102. The subcladding 118 can be arranged with respect to the core 108, such as to tend to confine light within the core 108 for communication through the waveguide 102 toward the light output 106. A supporting layer or cover layer 120 can be included in the waveguide, such as adjacent to the LC material 110 layer, such as shown in FIG. 1, or adjacent to the subcladding layer 118, in another example.

In an illustrative example of operation, laser or other light can enter the waveguide 102 as an input beam through a facet cut or otherwise formed into an infrared-transmitting substrate 116 at an angle $\theta_{air}$ relative to a facet normal, where the facet normal can be defined to be orthogonal to the facet surface formed in the substrate 116. The input light is refracted at the facet surface, such as toward a direction that can be aimed generally toward the core 108 of the waveguide 102, such as via the subcladding 118. A portion of the light that enters the substrate 116 via the facet surface encounters an incoupling region of the waveguide 102, via which such light can enter the core 108 (e.g., via the subcladding 118) of a thin-film planar waveguide 102 with high incoupling efficiency, due to its interaction with the tapered cross-sectional structure of the subcladding 118 within the incoupling region of the waveguide. Downstream from the incoupling region of the waveguide 102, light is trapped or generally confined within the core 108 of the waveguide 102 and travels downstream toward the light output 106 of the waveguide 102. Note that FIG. 1 and the other figures herein are not necessarily drawn to scale, such that in an actual LCW system 100 and waveguide 102, the cross-sectional thickness of the LC material 110 layer and of the subcladding 118 can be larger than the thickness of the core 108 such as by an order of magnitude or more.

In FIG. 1, the LC waveguide 102 can include one or more cladding layers that include or are composed of a liquid crystal (LC) material 110. Therefore, the local effective refractive index of the guided light in the waveguide 102 can be controlled, such as by placing one or more voltages on different regions of a patterned electrode 122 structure, such as can be located on one of the sides of the LC material 110 layer. These patterned electrodes 122 can then be used with their respective applied voltages to place selectively patterned electric fields across the LC material 110 layer, which, in turn, can result in a pattern of varying refractive index as seen by the guided light traveling generally through and confined by the planar core 108, but having some portion of the light beam distribution interacting with the adjacent LC material 110 layer. In an example, this effective refractive index patterning can be used to steer the guided light in an "in-plane steering" section of the waveguide 102. The direction of travel of the in-plane steered light can be steered via the planar waveguide 102 to have an in-plane component within the planar core 108 that would be orthogonal to the plane defined by the page upon which FIG. 1 appears. The voltage-controlled modulation of the effective refractive index of the LC material 110 layer can additionally or alternatively be used to control an out-of-plane (e.g., out of the plane of the planar core 108) steering as the light exits the waveguide 102 in an outcoupling region located near the voltage-tunable output electrode 124.

LCW systems 100 and waveguides 102 can additionally or alternatively be used for a variety of other purposes besides the two-dimensional (2D) light beamsteering described above. Such systems, devices, and methods can also be used in one-dimensional (1D) steerers, phase shifters, filters, polarization control systems, or other optical systems.

The present inventors have recognized, among other things, that in addition to the techniques described above, the LCW tuning effect can additionally or alternatively be used to adjust or optimize incoupling efficiency of the light provided by an input laser into the core 108 of the waveguide 102. This can be accomplished by including the incoupling control electrode 114 in the incoupling region of the waveguide 102, such as on the side of the LC material 110 layer that is located opposite to the incoupling taper shown in FIG. 1. When a control voltage is applied to the incoupling control electrode 114, liquid crystal molecules are rotated in this region of the LC material 110 layer, which leads to a change in the effective optimal input laser light beam angle, which, in turn leads to a change in incoupling efficiency for a given input laser light beam angle. In an example, this adjustable incoupling efficiency can be used in a feedback or other compensation arrangement, such as to accommodate (e.g., reduce the overall system sensitivity to) variations in one or more parameters to which the LCW system 100 may otherwise be overly sensitive, such as to accommodate a variation in at least one of input laser light incidence angle, input laser wavelength, input laser position, LCW or input laser temperature, or input laser optical power level.

If, for example, an LC waveguide 102 and an input laser providing the input beam shown in FIG. 1 are mounted together in a combined photonic system such that the mechanical angle between the laser beam direction and the planar face of input taper of the substrate 116 is incorrect, a control signal voltage can be applied to the incoupling control electrode 114 to help compensate for this alignment error and to allow efficient performance of the LC system 100. Additionally or alternatively, if the photonic LC system 100 is placed in a highly vibrationally-active environment, active feedback control of the control signal voltage applied to the incoupling control electrode 114 can be used to help compensate for light incoupling losses or variations, such as due to the vibrations or other real-time mechanical motion.

Light with wavelength $\lambda$ in a liquid crystal waveguide 102 is characterized by an effective refractive index $N_{eff}$, which can be calculated. If the distance from the core 108 to the substrate 116 is large enough, then the ideal input angle for light at the substrate-subcladding interface ($\theta_{substrate}$) is given by:

$$\theta_{substrate} = \sin^{-1}(N_{eff}/n_{substrate}) \qquad \text{Eq. 1}$$

in which $n_{substrate}$ is the index of refraction of the substrate 116 material. $N_{eff}$ is determined by the thicknesses of the waveguide materials, their refractive index profiles, and by the wavelength of laser light incident in the input beam. This quantity can be calculated, and equations can be used to solve an even more complex problem of predicting quantitative incoupling efficiency when the input laser angle is not ideal. Such techniques can also be used to find the dependence of incoupling efficiency on input laser position, input laser beam width, and input laser wavelength, such as explained below, where results of such analysis are presented to quantify the predicted behavior of the LC system 100 using active control of light incoupling.

Changes in the interaction between the input laser and the LCW 102 of the LCW system 100 can result in a decrease or variations in incoupling efficiency. Such changes or variations can include, among other things, wavelength drift in the input laser, changes in input laser angle, and heating or cooling of the LCW. In each case, as explained herein, the present techniques can make it possible to help recover, maintain, or stabilize good light incoupling efficiency by adjusting control signal voltage on the incoupling control electrode 114, such as in order to change $N_{eff}$ in the light input incoupling region to a value that is appropriate for efficient or stable coupling in spite of such changes or variations.

Figure 2:
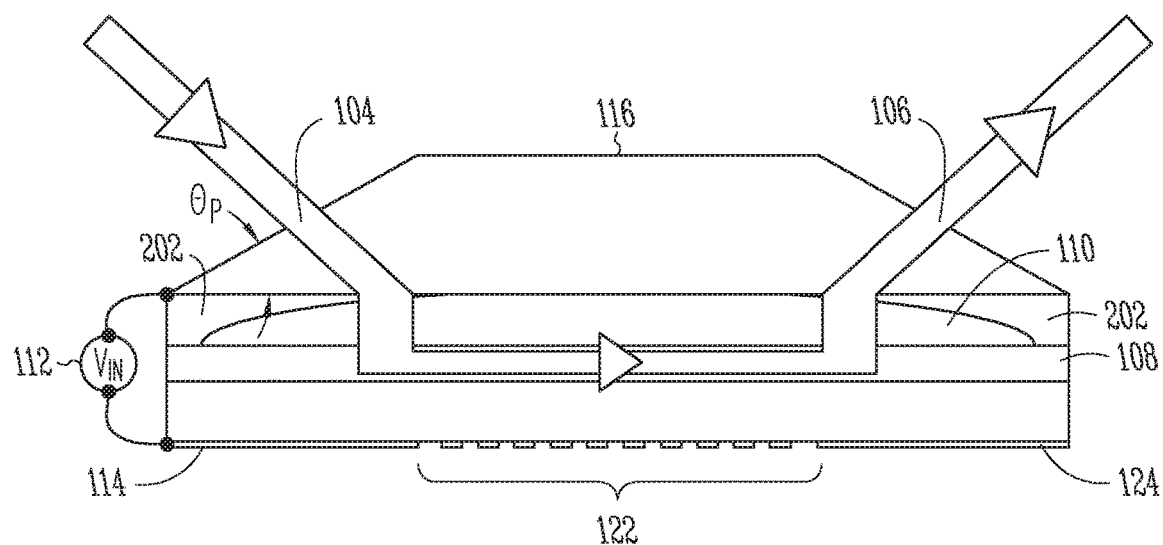
FIG. 2 shows an example of an active incoupling control stage at the input to a liquid crystal waveguide with an "upside-down" incoupler including or consisting of a tapered layer above the liquid crystal cell.

FIG. 2 shows a cross-sectional view of another example of portions of a Liquid Crystal Waveguide (LCW) system 100, similar to FIG. 1, but in which the LC material 110 can be located between the core 108 and the substrate 116, instead of the subcladding material 118 being located between the core 108 and the substrate 116 as shown in the example of FIG. 1. Thus, FIG. 2 shows an example that can be referred to as an "upside-down" incoupler arrangement. In FIG. 2, the core 108 and the subcladding 118 can both include or consist of generally flat layers, with a LC material layer 110 adjacent to the core 108 such as to form a cladding layer on that side of the core 108. A cross-sectionally tapered coupler layer 202 can be placed on the substrate 116 in the path of the incoming light on its way to the LC layer 110 and the core 108. The coupler layer 202 can provide an incoupling zone or region where light can be incoupled into the core 108. The refractive index of the coupler layer 202 can be high, such as higher than the maximum voltage-controlled refractive index of the LC material layer 110, or even as high as the refractive index of the substrate 116.

Incoupling of light can be very efficient at the beginning of the taper (corresponding to a thinner cross-sectional region of the LC material 110) because at such thinner locations the effective incoupling strength allows incoming light to more directly access the core 108. Incoupling of light can be very inefficient at the end of the taper because the LC layer 110 height is large enough to provide good optical isolation between substrate 116 and the core 108. By engineering the shape of this cross-sectionally tapered structure, incoming laser light can be incoupled into the core 108 with very high total efficiency, and control over incoupling can be achieved by varying the control voltage signal applied to the incoupling control electrode 114. The shape of the cross-sectionally tapered structure can be engineered to be specific to an expected beam profile of the particular laser or type of laser that will be used to provide light to the LC waveguide 102. As explained above with respect to FIG. 1, an incoupling control electrode 114 can be used to receive an input control signal 112 to apply a local electric field across the LC layer 110 such as to help establish, adjust, maintain, or maximize incoupling efficiency for a given input laser configuration.

Figure 3:
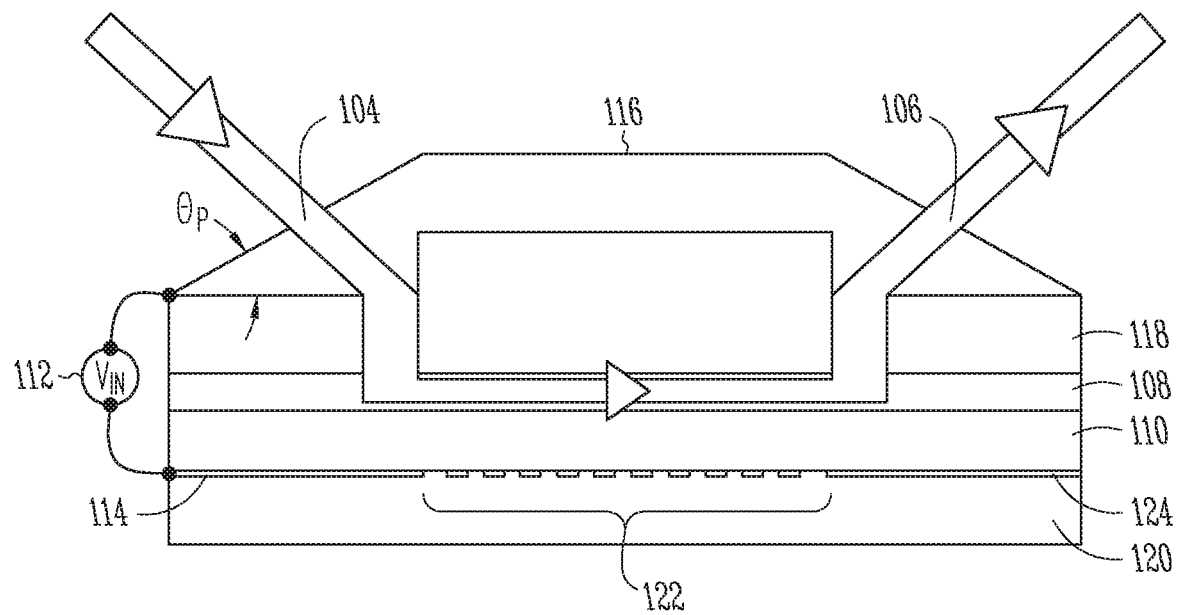
FIG. 3 shows an example of an active incoupling control stage at the input to a liquid crystal waveguide with a step coupler. Note that this implementation can also include or consist of multiple steps.

FIG. 3 shows a cross-sectional view of another example of portions of a Liquid Crystal Waveguide (LCW) system 100, similar to FIG. 1, but in which no cross-sectionally tapered subcladding 118 or LC material 110 need be present. Instead, FIG. 3 shows an example of a "step coupler" configuration, in which there can be one or more abrupt cross-sectional steps in the substrate 116 or subcladding 118 cross-sectional height, such as can provide a contrast between a thinner (lower height) incoupling region, in which laser light can access and incouple into the core 108, and a steering or optical isolation region (increased height), in which the larger thickness of the subcladding 118 can help provide optical isolation between the core 108 and the substrate 116. This step-coupler incoupling scheme may not be as efficient as the cross-sectionally tapered structures shown in FIGS. 1-2, but it is still expected to be capable of relatively efficient behavior. As explained herein, the incoupling properties (e.g., efficiency) of the LCW system 100 shown in FIG. 3 can also be very effectively controlled using an active incoupling control system, such as by applying an incoupling control signal 112 to an incoupling control electrode 114 that can be located so as to be able to influence incoupling in the (lower height) incoupling region of the LCW system 100.

Figure 4:
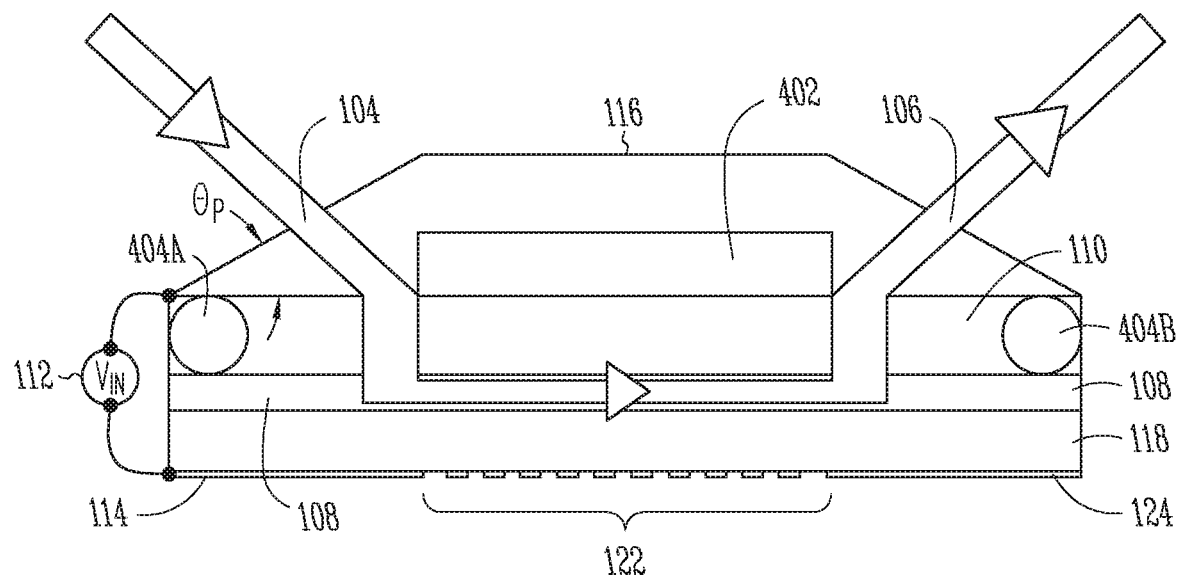
FIG. 4 shows an example of an active incoupling control stage at the input to a liquid crystal waveguide with an "upside-down" step coupler. Note that this implementation can also include or consist of multiple steps as well.

FIG. 4 shows a cross-sectional view of another "step coupler" configuration example of portions of a Liquid Crystal Waveguide (LCW) system 100, similar to FIGS. 2-3. In the "step coupler" configuration example of FIG. 4, the LC layer 110 can be adjacent to the substrate 116, and the cross-sectional step can be provided by a valley in the substrate 116 that can be filled with a fill material region 402 such as silicon dioxide or other material having a lower index of refraction than that of the substrate 116. The fill material can define an underlying (as shown in FIG. 4) optical isolation guiding region, while allowing the LC material 110 layer to optionally retain a consistent cross-sectional height (as shown in FIG. 4) across much or all of its length. In an example, such as shown in FIG. 4, spacer beads 404 can be included, such as can be used during manufacturing to define a cross-sectional thickness of the LC material 110 in the example shown in FIG. 4, or in the other examples shown and described herein. As explained herein, the incoupling properties (e.g., efficiency) of the LCW system 100 shown in FIG. 4 can also be very effectively controlled using an active incoupling control system, such as by applying an incoupling control signal 112 to an incoupling control electrode 114 that can be located so as to be able to influence incoupling in the (lower height) incoupling region of the LCW system 100 before the fill region 402 is encountered downstream in the LC waveguide 102.

Figure 5:
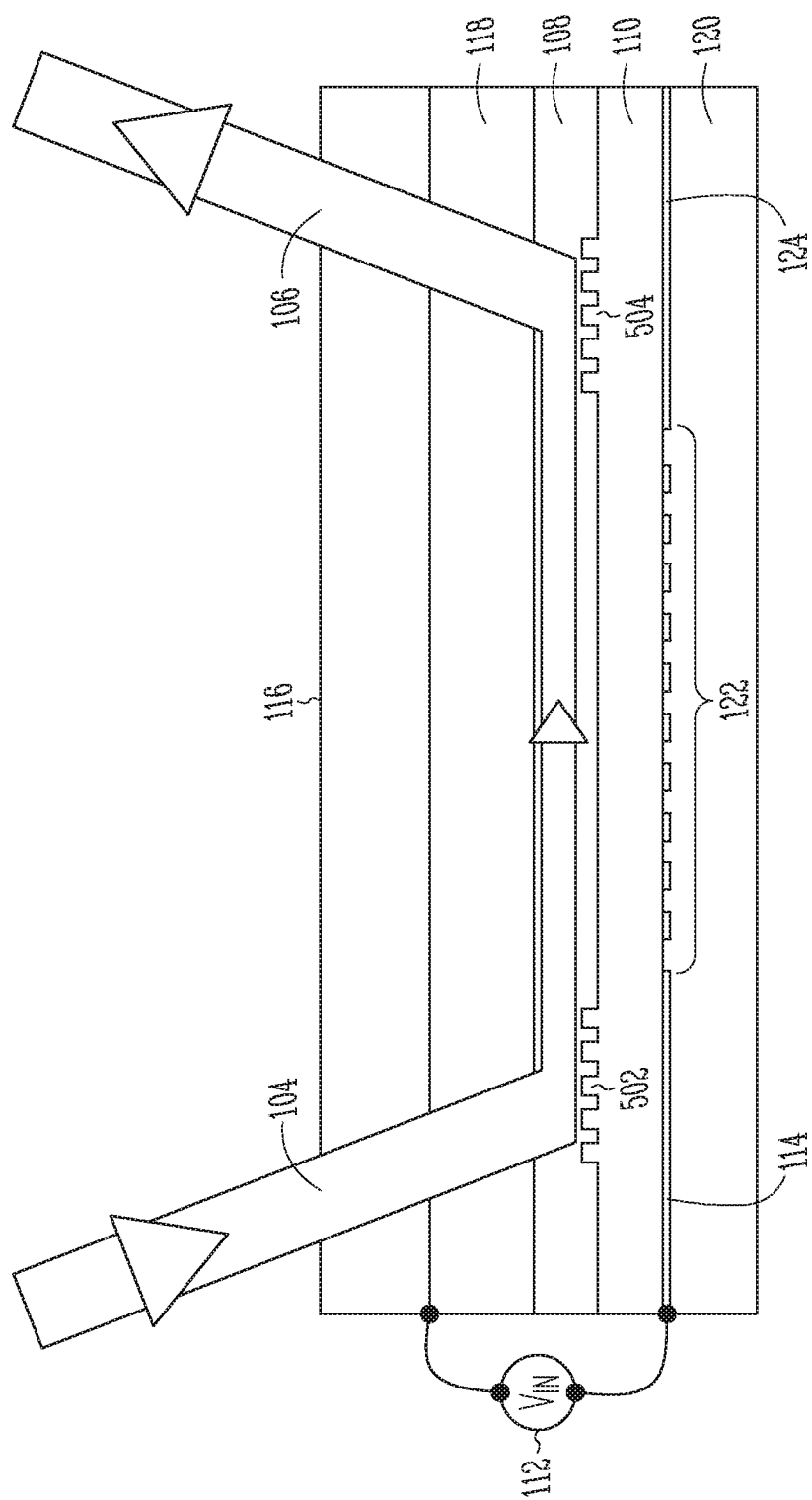
FIG. 5 shows an example of an active incoupling control stage at the input to a liquid crystal waveguide with a grating coupler patterned onto the surface of the waveguide core that is in contact with the liquid crystal cell.

FIG. 5 shows a cross-sectional view of another example of portions of a Liquid Crystal Waveguide (LCW) system 100, similar to FIG. 1, but in which incoupling, outcoupling, or both can be at least partially diffractive, such as by including a diffractive grating structure. In FIG. 5, the input light beam can be diffracted by a diffraction grating 502 that can be written into the surface of the core 108 at a location within an incoupling region, such as to at least partially diffractively redirect laser light into the core 108 of the LC waveguide 102. Another diffraction grating 504 can be located in an outcoupling region of the LC waveguide 102, such as for at least partially diffractively outcoupling light from the LC waveguide 102 in its outcoupling region. In FIG. 5, an incoupling control voltage signal 112 can be applied to an incoupling control electrode 114 to adjust the Neff in the incoupling region of the waveguide 102, such as to adjust or modulate incoupling efficiency, such as to help compensate for changes in the laser-LC waveguide 102 interaction, such as explained elsewhere herein.

Figure 6:
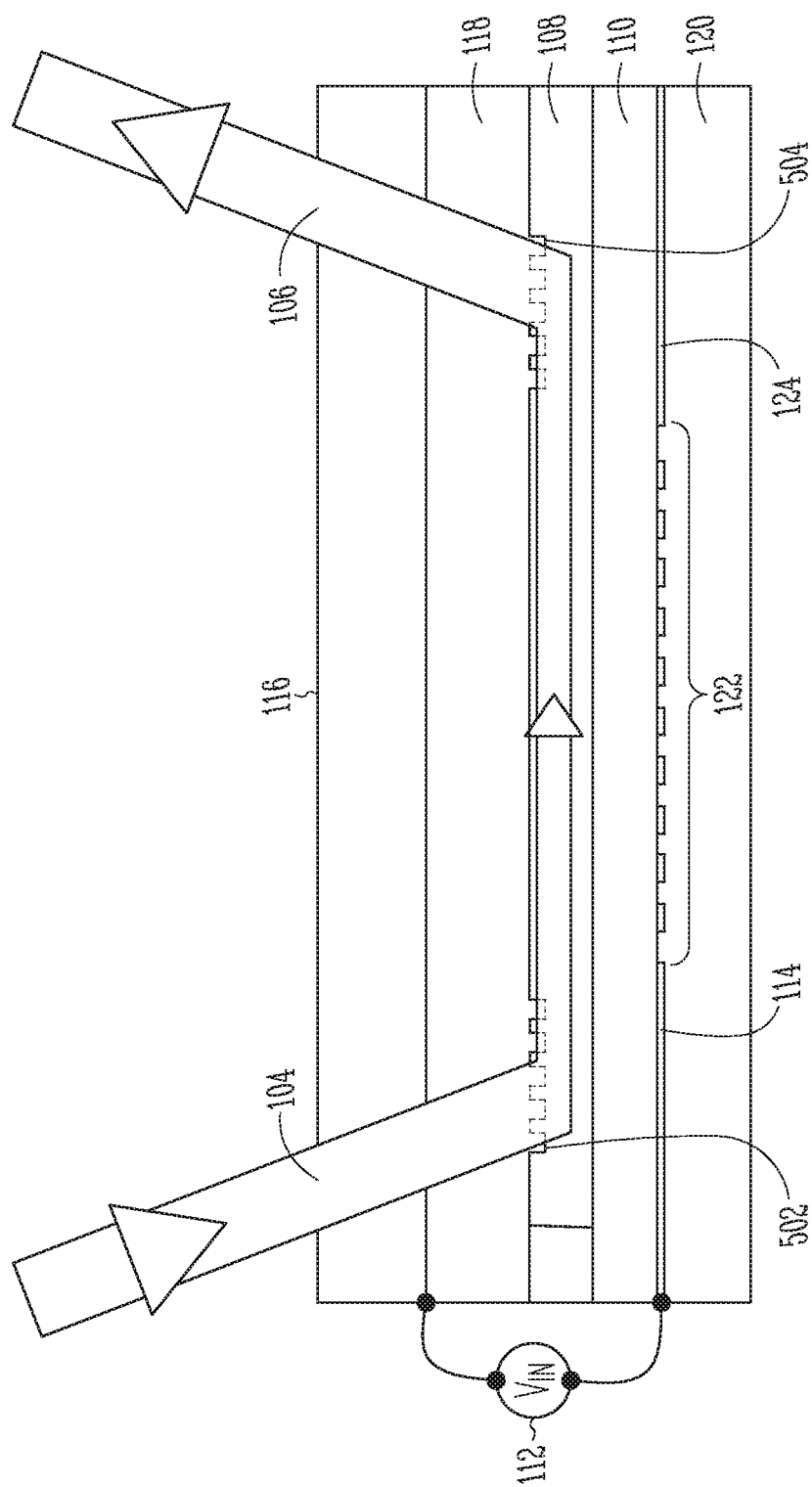
FIG. 6 shows an example of an active incoupling control stage at the input to a liquid crystal waveguide with a grating coupler patterned into the surface of the waveguide core that is in contact with the solid subcladding. Note that this patterning could alternatively be placed on the subcladding layer.

FIG. 6 shows a cross-sectional view of another example of portions of a Liquid Crystal Waveguide (LCW) system 100, similar to FIG. 5, but in which one or both of the diffraction gratings 502, 504 can be written or otherwise formed to be located on the other side of the core 108, such as adjacent to or in contact with the subcladding 118, rather than being adjacent to the LC material 110 layer as shown in FIG. 5. In FIG. 6, one or both of the diffraction gratings 502, 504 can instead or additionally be written or otherwise formed to be located on the surface of the subcladding layer 118, rather than within the core 108. Note that waveguides 102 shown in FIGS. 1-6 can also be created with any combination of the coupling structures or methods described herein. For example, an LC waveguide 102 can include or consist of a cross-sectionally tapered input coupler and a diffraction grating outcoupler. Other variations, permutations, and combinations are also possible.

Figure 7:
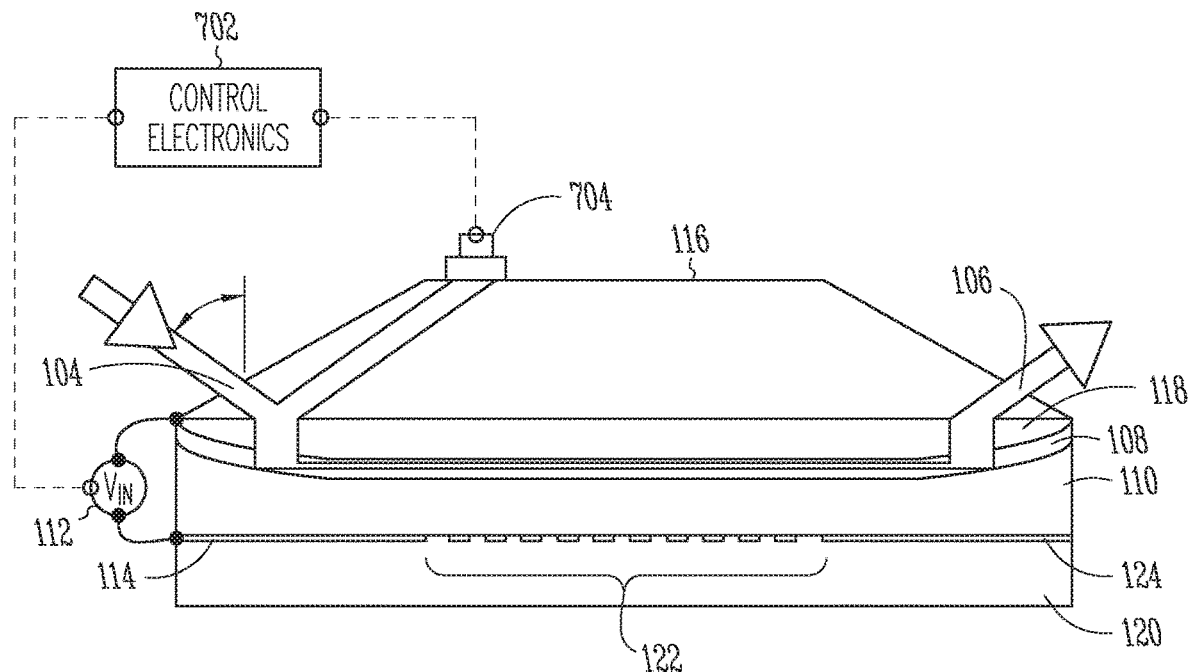
FIG. 7 shows an example of a configuration of the active incoupling. Control electronics can be used to minimize the amount of light that is reflected back into the substrate and onto a photodetector.

FIG. 7 shows a cross-sectional view of another example of portions of a Liquid Crystal Waveguide (LCW) system 100, similar to FIG. 1, but in which the LCW system 100 can include additional components such as control electronics or a controller circuit 702 and a photodetector or light detector 704. As explained herein, the controller circuit 702 can be electrically coupled to the incoupling control electrode 114 and another electrode 115 that can be located at least partially across the LC layer 110, such as upon the substrate 116 or the subcladding 118, such as for applying the incoupling control signal 112 to the incoupling control electrode 114. The controller circuit 702 can also be electrically coupled to the light detector 704. In operation, the controller circuit 702 can be used to establish or adjust the incoupling control signal 112 applied to the incoupling control electrode 114 at least partially in response to a light signal detected by the light detector 704, such as in an active feedback closed-loop fashion to adjust the amount of light incoupling in response to an error signal or other indication that can be provided at least in part by the light detector 704. As explained herein, such control can provide real-time adjustment to provide stable operation of the LCW system 100 in spite of changes or variations in the LCW system 100 or its operating environment.

In an example of an LCW system 100 with actively controlled light incoupling, some form of feedback can be used by the controller circuit 702 to help the LCW system 100 establish or adjust an appropriate or optimal value for the incoupling control signal 112 voltage applied to the incoupling control electrode 114, such as with respect to the other electrode 115, or vice-versa. One way to do this can include locating the light detector 704 to receive at least a small portion of the output beam being provided at the light output 106, such as by including and using a partially reflective mirror to direct such sampled light representing the output light beam onto the photodetector 704. In such a case, the incoupling control signal voltage 112 applied to the incoupling control electrode 114 can be established or adjusted in a manner that tends to increase or to maximize the amount of light passing through the LC waveguide 102 and provided as the output beam of the light output 106, as detected by the light detector 704. However, one potential limitation of this approach is that it may need a large light detector 704 (or associated reflective mirror or other light detection components) to capture the output beam from the LC waveguide 102 over the full range of in-plane, and out-of-plane beam steering angles and translations that may be applied by the LC waveguide 102.

As shown in FIG. 7, the light detector 704 can alternatively be located to receive light input that did not incouple into the core 108, such as light input that instead underwent one or more bounces inside the substrate 116. In such a case, the incoupling control signal voltage 112 applied to the incoupling control electrode 114 can be established or adjusted in a manner that tends to decrease or minimize the amount of light detected by the light detector 704 as having not been incoupled into the core 108. A potential advantage of this approach is that this internally reflected (e.g., within the substrate 116) light beam component does not experience either in-plane steering or out-of-plane steering as does light that actually is incoupled into the core 108 and steered by the beamsteering portions of the LC waveguide 102. Therefore, the light detector 704 can be located at a much better-defined location, since more localized light detection is possible in this approach.

Figure 8:
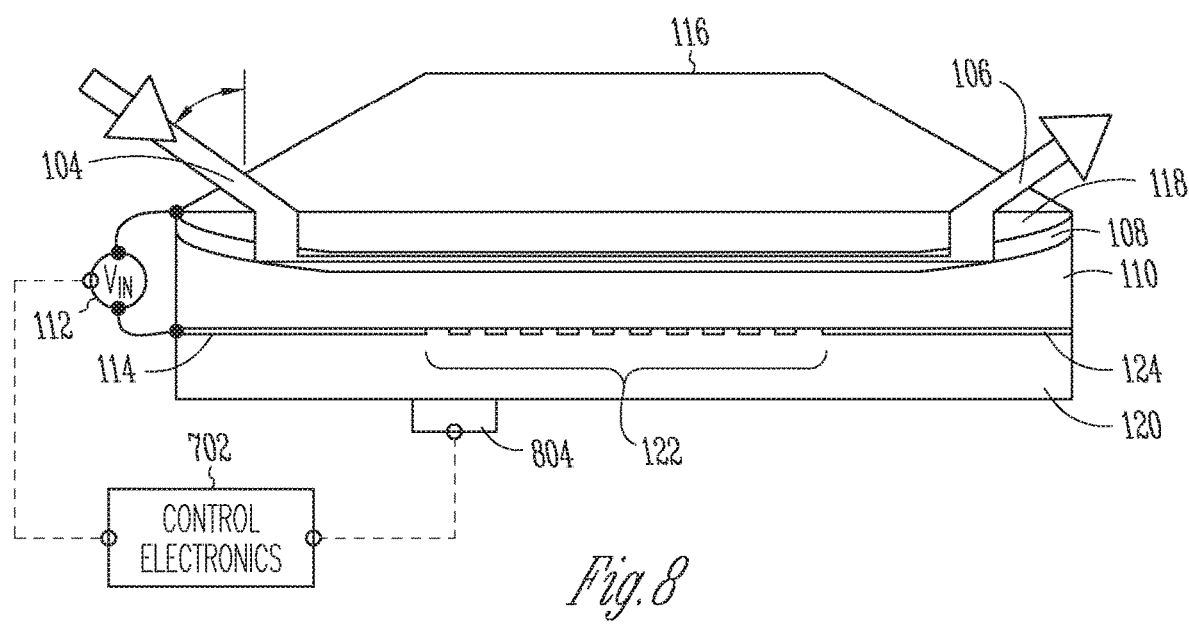
FIG. 8 shows an example of the active incoupling. Control electronics can be used to read a temperature sensor on the LC waveguide and to change the incoupler voltage accordingly.

FIG. 8 shows a cross-sectional view of another example of portions of a Liquid Crystal Waveguide (LCW) system 100, similar to FIG. 1, but in which the LCW system 100 can include additional components such as control electronics or a controller circuit 702 and a temperature sensor 804, such as can be located on or at the LW waveguide 702 or on or at the input laser that can be included in or used in combination with the LCW system 100, depending on the desired application. As explained herein, the controller circuit 702 can be electrically coupled to the incoupling control electrode 114 and another electrode 115 that can be located at least partially across the LC layer 110, such as upon the substrate 116 or the subcladding 118, such as for applying the incoupling control signal 112 to the incoupling control electrode 114. The controller circuit 702 can also be electrically coupled to the temperature sensor 804. In operation, the controller circuit 702 can be used to establish or adjust the incoupling control signal 112 applied to the incoupling control electrode 114 at least partially in response to an indication of temperatures such as detected by the temperature sensor 804, such as in an active feedback closed-loop fashion to adjust the amount of light incoupling in response to an error signal or other indication that can be provided at least in part by the temperature sensor 804. As explained herein, such control can provide real-time adjustment to provide stable operation of the LCW system 100 in spite of changes or variations in the LCW system 100 or its operating environment.

Thus, in the example of FIG. 8, an actively-controlled light incoupling system need not be required to actually sample an indication of the optical power provided by or in response to the input laser beam at all. FIG. 8 shows an example in which the temperature sensor 804 can instead be used to measure temperature, e.g., of the LC waveguide 102. This measured temperature information can be fed to the controller circuit 702. The controller circuit 702 can use a look-up table or other functional or mapping tool or construct to determine the proper incoupling signal voltage 112 to be applied to the incoupling electrode 114 to provide desired operation at such temperature. While LC waveguide 102 temperature can have a component that is influenced by the optical power provided by the laser and incoupled into the LC waveguide 102, the ambient temperature in the environment in which the LC waveguide operates can also affect the temperature detected by the temperature sensor 804. Therefore, an additional ambient temperature sensor (e.g., located separate or thermally insulated from the LC waveguide 102) can be used, and a differential temperature measurement (LC waveguide temperature−ambient temperature) may be used by the controller circuit 702 to access the appropriate incoupling signal voltage to be applied to the incoupling electrode 114 to provide the desired operation.

Figure 9:
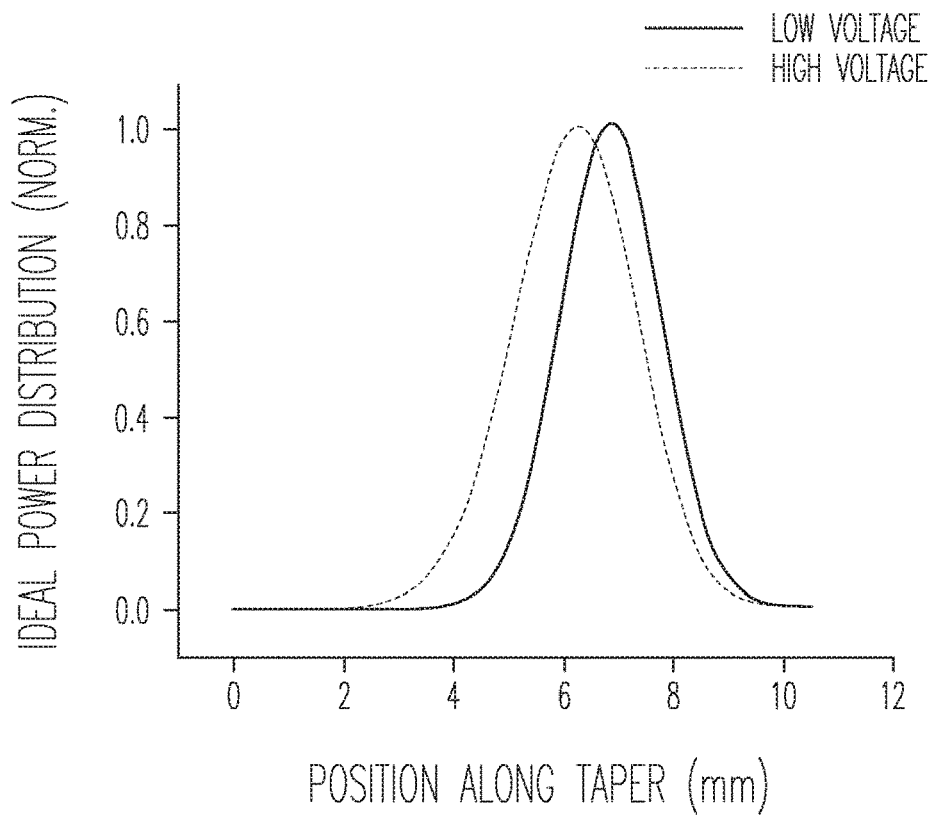
FIG. 9 shows an example of a calculated projection of an ideal input laser beam along the incoupler region of the liquid crystal waveguide over a full range of control voltage for a typical implementation (such as shown in FIG. 1).

FIG. 9 shows an example of graph of calculated values of the ideal power distribution (normalized) vs. position along the cross-sectional taper (mm) of the incoupled light beam. In FIG. 9, the calculated projections along the taper plane for the input beam profiles that give best incoupling efficiency for an exemplary LC waveguide 102 are shown. In FIG. 9, the solid line shows the profile when a low incoupling control voltage 112 signal is applied across the LC layer 110 and the dotted line shows the profile when a high voltage is applied. In addition to the change in $N_{eff}$ (and incoupling angle) described herein, these calculations show that the applied incoupling control voltage change results in a broadening and a shifting in the ideal beam position. In many cases in which the present active coupling are to be used, this effect may include undesirable implications, because it can cause the ideal beam location to "walk off" from the location where the laser beam is actually directed.

A detailed modeling was carried out, using techniques that fully account for wavelength, angle, position, and beamwidth effects for an arbitrary beam interacting with a cross-sectionally tapered incoupler structure, such as shown in the example of FIG. 1. The input laser was assumed to have a Gaussian beam profile and the LC material 110 was assigned a single refractive index corresponding to the projection of the birefringence in a direction normal to the layers of the slab waveguide stack of the LC waveguide 102. The light was designated as being TM-polarized and the LC material 110 was designated to be of a heterogeneous type. None of these choices are required for using the present actively controlled incoupling of light into an LC waveguide 102, but they allow adequate testing of the present concepts and techniques. In all cases, laser position and beamwidth were chosen to maximize incoupling. All calculations were performed using a cross-sectional taper configuration of the type shown in FIG. 1.

Figure 10:
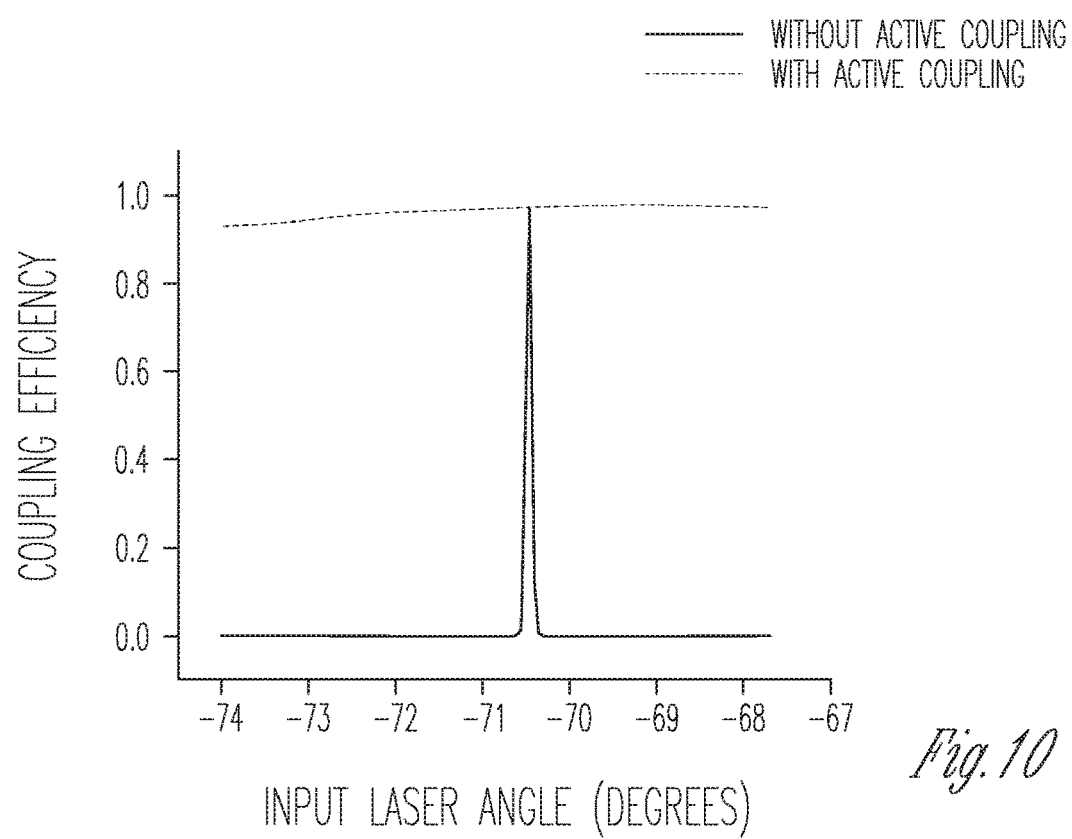
FIG. 10 shows an example of a calculated input laser incoupling efficiency into a tapered subcladding coupler (such as shown in FIG. 1) as a function of input laser angle with and without the active incoupling system in use.

FIG. 10 shows an example of results of a calculation that predicts the effectiveness of the active incoupling method when the laser's input angle is varied but its wavelength, beam width, and position are kept constant. Incoupling efficiency is defined as the ratio of the laser power that is launched into the steering (optically isolated) region of the waveguide 102 compared to the laser power incident on the incoupling region of the waveguide 102. In FIG. 10, the solid line shows the dependence of incoupling efficiency on input laser angle when the incoupling control signal 112 voltage is kept constant. In this case, incoupling efficiency drops off rapidly when the input laser angle is moved away from its ideal value. The dashed line shows the incoupling efficiency when input laser angle is varied and the incoupling control signal 112 voltage is set to maximize incoupling efficiency. In this latter situation, good incoupling of light is achieved over a much larger input laser angle range. Note the small drop in active incoupling efficiency on the left side of the plot, which results from the "walk" in ideal beam position and beam width compared to that of the input laser. In this example, the effect is rather small, indicating that this technique is viable for use in an actual LCW system 100.

Figure 11:
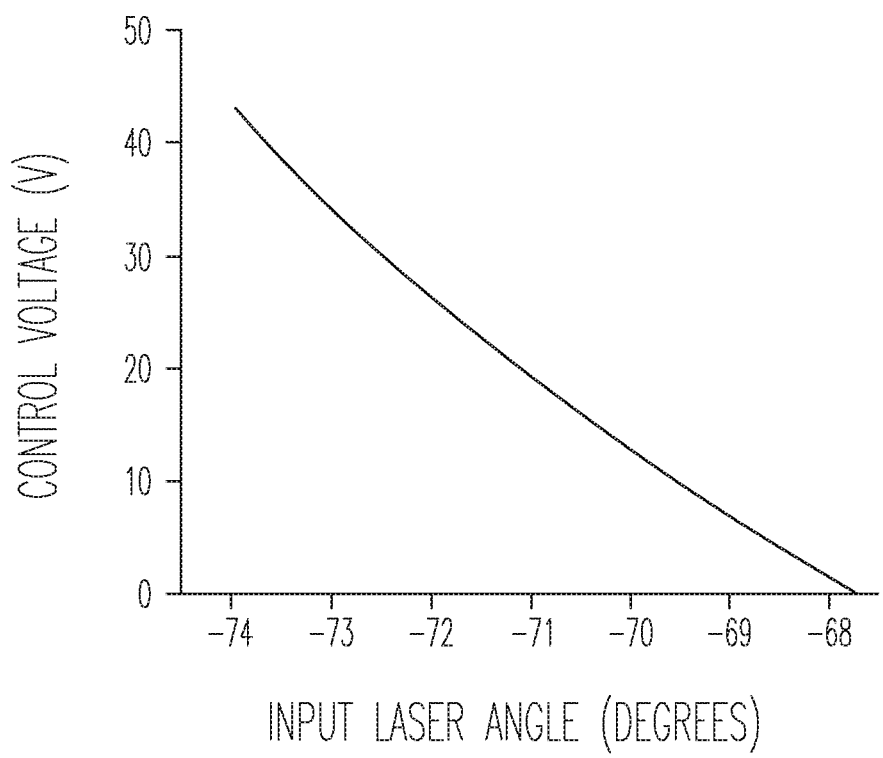
FIG. 11 shows an example of a calculated control voltage needed to achieve the active incoupling such as shown in FIG. 10.

FIG. 11 shows an illustrative example of the incoupling control signal 112 voltage to achieve the active incoupling performance shown in FIG. 10. These incoupling control signal voltages are well within the range of values reasonable to be made available in an LCW system 100. Therefore, this active incoupling method can be used to compensate for mechanical variations or instabilities encountered by an LC waveguide 702 deployed in a vibration-heavy environment, or to compensate for manufacturing irregularities (the present techniques need not include ongoing active closed-loop feedback such as described herein, but can alternatively be used for calibration, e.g., at manufacturing or in the field). It should be noted that any mechanical variations in input laser beam angle are likely to also be accompanied by laser beam spot translations away from the ideal beam spot location. However, when the same analysis is applied to find the tolerance to positional errors, a full-width-half-maximum (FWHM) acceptance range of 3 mm is calculated. This is rather insensitive in comparison with the approximately 0.1° tolerance to input angle shown in the solid line in FIG. 10. Therefore, the present approach to active incoupling in the LCW system 100 is expected to be applicable in situations in which moderate amounts of mechanical error can be present.

In addition to accommodating mechanical variations, such as shown in FIG. 10, the active incoupling system and techniques described herein can also be used to compensate for fluctuation in input laser wavelength.

Figure 12:
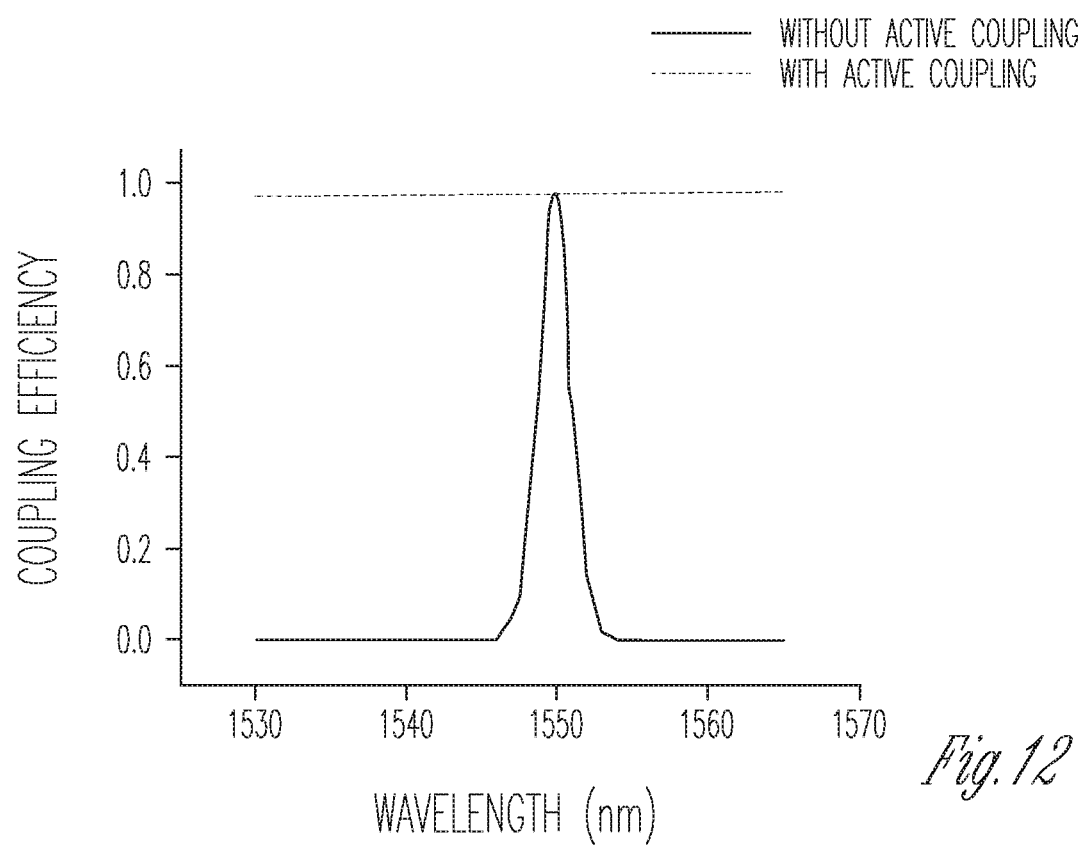
FIG. 12 shows an example of calculated incoupling efficiency for a typical tapered coupler implementation (such as shown in FIG. 1) as a function of input laser wavelength with and without the active coupling system. The wavelength range has been chosen to cover the entire infrared "C-band"

FIG. 12 shows a calculated example of predicted LCW incoupling efficiency with and without active incoupling over a range of wavelengths from 1530 to 1565 nm. This wavelength range was chosen for this illustrative example to coincide with the infrared "C-band." As in the case of mechanical variations or instabilities, laser wavelength drift can quickly lead to loss of incoupling efficiency when active incoupling control is off. When the active incoupling control is applied, though, very high incoupling efficiency can be achieved over the entire wavelength range.

Figure 13:
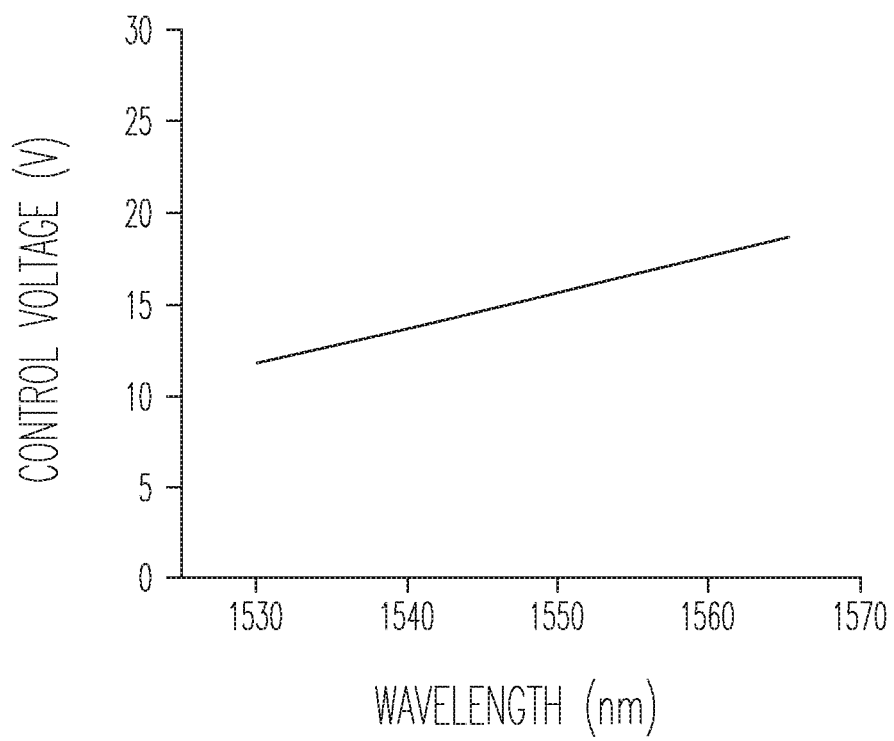
FIG. 13 shows an example of calculated control voltage needed to achieve the active incoupling shown in FIG. 12.

FIG. 13 shows a calculated example of the incoupling control signal 112 voltage needed to maintain incoupling over the C-band. Compared to the results shown in FIG. 11, a relatively small range of incoupling control voltages are needed to accomplish this objective. Therefore, the present LCW system 100 and techniques should be capable of good incoupling control over a much larger range of input wavelengths than would be the case without using such techniques.

Figure 14:
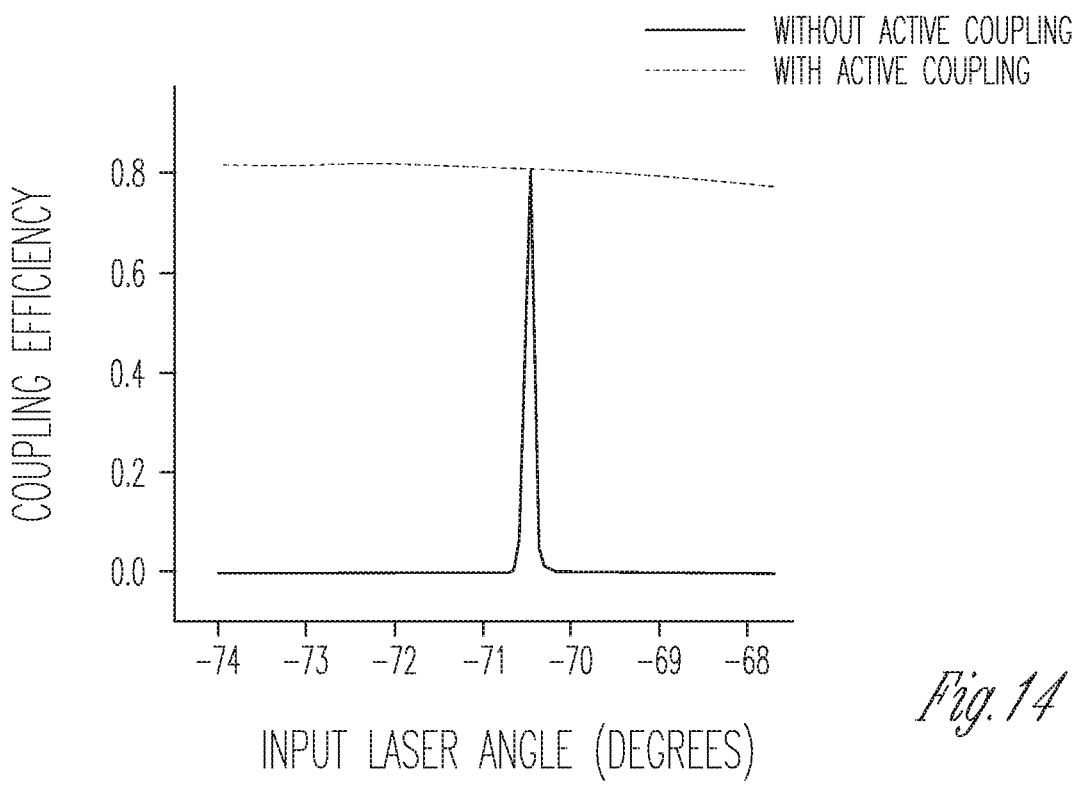
FIG. 14 shows an example of calculated input laser incoupling efficiency into a step coupler (such as shown in FIG. 3) as a function of input laser angle with and without the active incoupling system in use.

FIG. 14 shows a calculated analysis example similar to the one shown in FIG. 10 but for a step coupler design of the type shown in FIG. 3 with a single step in the subcladding cross-sectional height. Note that for both the active and inactive incoupling schemes the peak efficiency is lower than was seen for the tapered coupler example. This is because the step coupler is less efficient than the tapered coupler. Nevertheless, active incoupling with a step coupler is similar to active incoupling with a tapered coupler in that it allows for good incoupling efficiency over a broad range of input laser angles. As in the tapered coupler case, the incoupling efficiency drops off somewhat at larger laser input beam angles, largely due to broadening of the ideal input beam as the LC refractive index is varied under voltage control. The incoupling efficiency drops off with a slope that is opposite to the one shown in FIG. 10.

As in the tapered coupler case, this result shows that active incoupling using the step coupler is a viable technique for maintaining device performance, such as in the presence of mechanical variations or imperfections. Again, in an actual LCW system 100, the input laser angle variation can be expected to be accompanied by some amount of laser beam position translation as well. However, the step coupler input efficiency is much more sensitive to input angle than it is to input laser beam position. Detailed analysis reveals a FWHM position sensitivity of 2.5 mm for the location of the laser beam spot along the coupler-core interface. This is therefore slightly more sensitive to laser beam position translation than the tapered coupler, due to the abrupt edge in the step coupler design.

Figure 15:
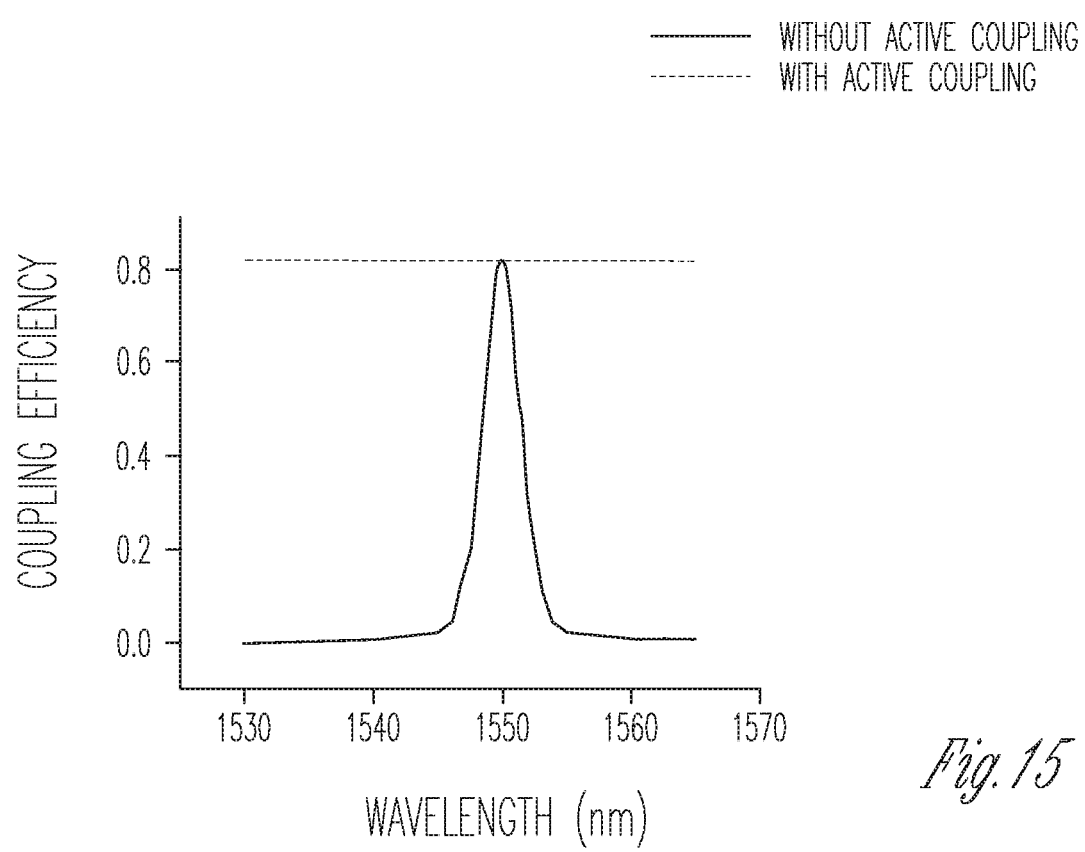
FIG. 15 shows an example of calculated incoupling efficiency for a step coupler (such as shown in FIG. 3) as a function of input laser wavelength with and without the active incoupling system. The wavelength range has been chosen to cover the entire infrared "C-band."

FIG. 15 shows an example of calculated results of a wavelength dependent analysis when actively controlled incoupling is applied in a step coupler design similar to the one shown in FIG. 3. As was true for the tapered coupler (e.g., as shown in FIG. 12), active coupling with the step coupler can lead to a significant improvement in insensitivity to input laser wavelength. Over the width of the C-band, there is no significant loss of active incoupling efficiency.

Experimental Results:

In the following section, we present experimental results on active coupling in a tapered coupler design similar to the one shown in FIG. 1. For these measurements, the incoupling control electrode 114 was rectangularly-shaped to cover the entire width and length of the input taper structure. This is expected to lead to a uniform electric field in the LC material 110 over the entire incoupling region. It should be noted that other shapes for the incoupling control electrode 114 may further improve the performance of this LCW system 100.

Unlike the simulation results discussed in the previous section, these measurements were carried out with a homeotropic LC material 110 with significantly less birefringence. In general, the use of homeotropic LC material 110 means that a decrease in incoupling control signal 112 voltage in these experimental results is equivalent to an increase in control voltage in the calculated/modeled results described above. Also, the reduced birefringence means that higher voltages are needed to achieve active incoupling than is required in the system that was modeled. In these experimental measurements, an unsteered laser beam was fired directly into a photodetector and incoupling control signal 112 voltage was varied to maximize the resulting photocurrent detected by the photodetector.

In many opto-electronic feedback loops, it can be desirable to dither the laser power to provide a signature that can be picked up with a lock-in amplifier. In this case, the dithering was provided by the incoupling control signal 112 voltage itself. In our LCW system 100, the incoupling control signal 112 voltages applied to the incoupling control electrode 114 are not constant with time. Instead, they are pseudo-DC, meaning that the voltage is a square wave with constant amplitude but rapidly-switching polarity. Because of the limited slew rate of our controller circuit, a small repeatable dip in LCW system throughput is present each time the polarity switches. This dip then provides the dithering needed for running the lock-in-based loop.

Figure 16:
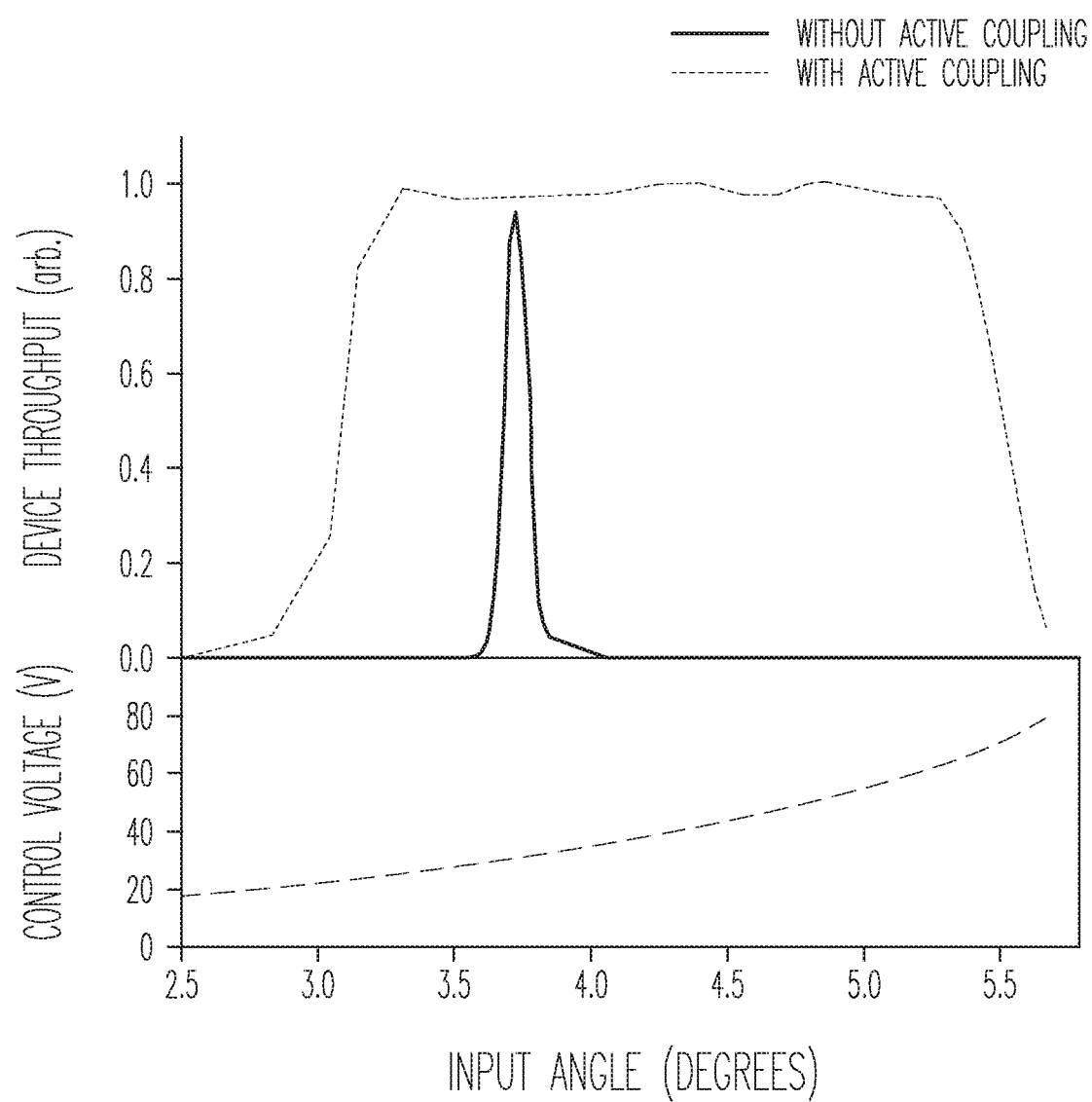
FIG. 16 shows an example of an experimental demonstration of the use of an active incoupling system to maintain incoupling efficiency as the laser's input angle is varied.

FIG. 16 (top) shows an example of LCW throughput as a function of input laser angle with and without active incoupling control. In this example, LCW throughput is defined as the ratio of laser power exiting the LC waveguide 102 compared to the maximum value measured when active incoupling control is in use. As expected from the simulations, LCW throughput is maintained over a much larger range of input laser beam angles when we use active incoupling control. By employing active incoupling control, the FWHM range of acceptance angles is increased from about 0.1° up to about 2.5°. Comparison with theory (FIG. 10) suggests that active incoupling control should work over an even larger range than this, so it is believed likely that the dropoff in throughput (at the edges of this plot) may be due to a limitation in our experimental setup. FIG. 16 (bottom) shows an example of the incoupling control signal 112 voltage that was needed to achieve active in coupling in this experiment. This is well within a typical range of operational voltages that can be made available.

Figure 17:
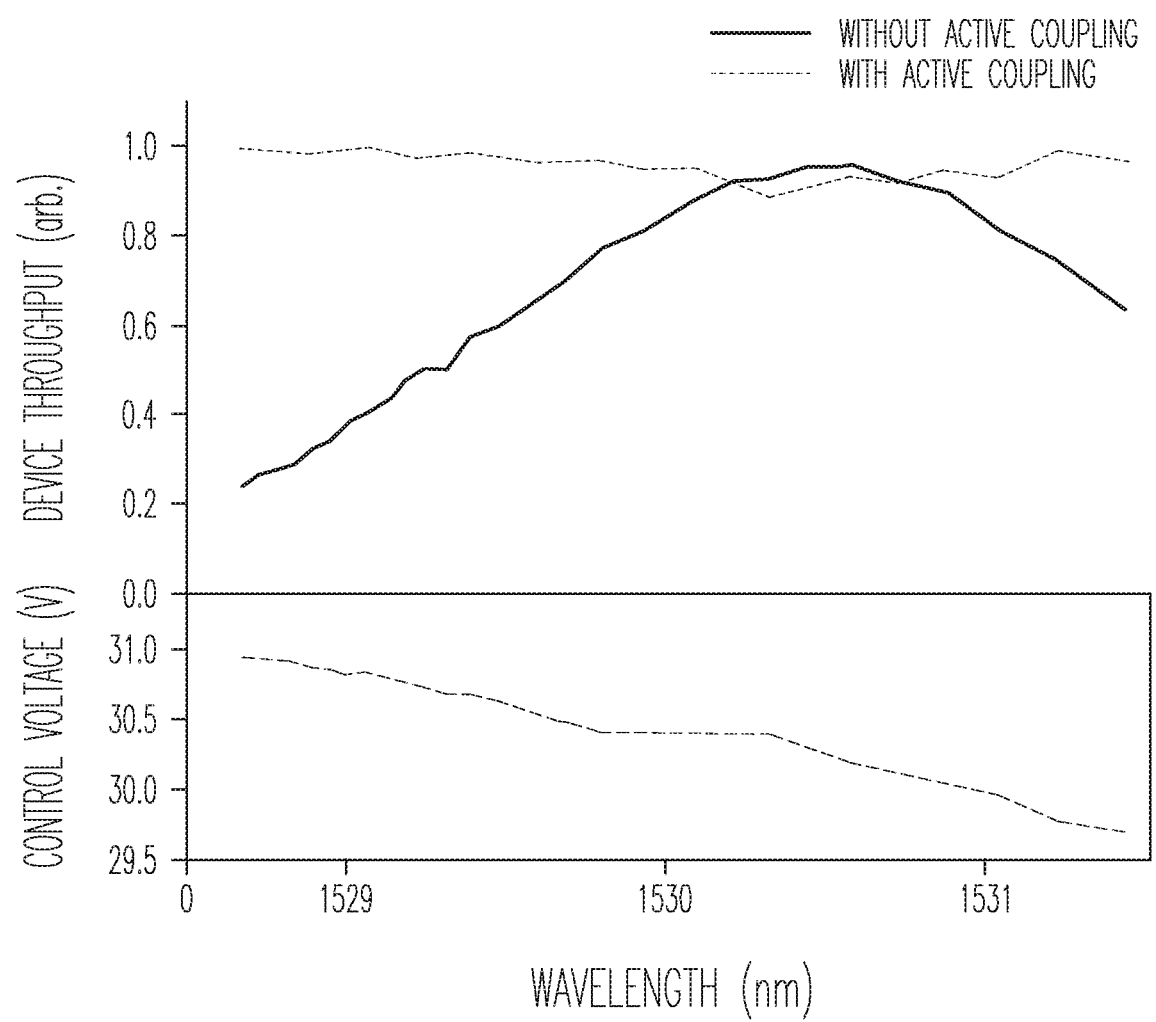
FIG. 17 shows an example of an experimental demonstration of the use of an active incoupling system to maintain incoupling efficiency as the laser's wavelength is varied.

FIG. 17 shows an example of the use of active incoupling control to correct for wavelength changes in the input laser beam. Again, as expected from our simulations, active incoupling is maintained quite well over the range of wavelengths examined. Note however that the range of wavelengths measured is considerably less than the range of the calculation (FIG. 12). For this reason, the incoupling control signal 112 voltage need not need to vary by a large amount.

Figure 18:
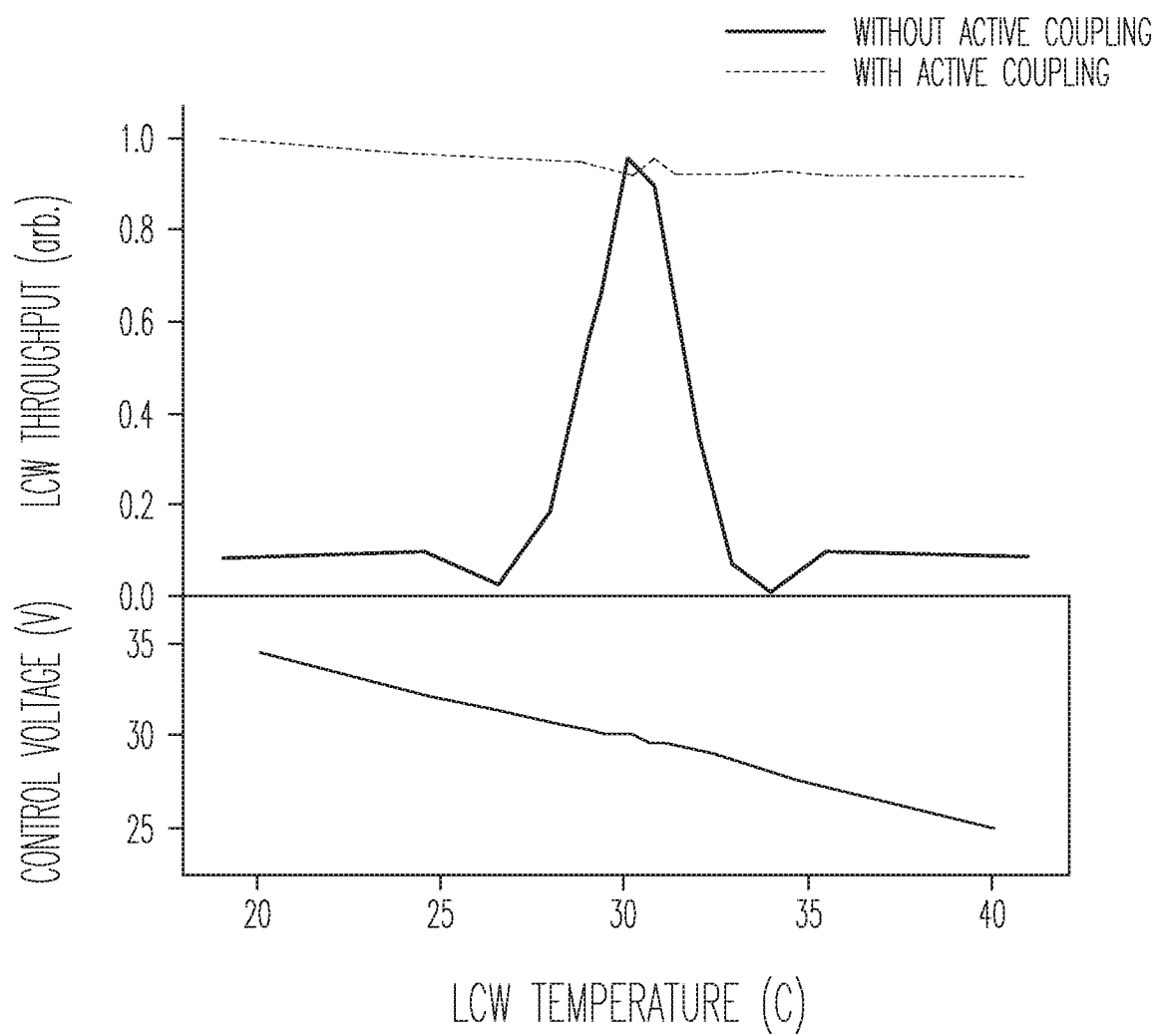
FIG. 18 shows an example of an experimental demonstration of the use of an active incoupling system to maintain incoupling efficiency as the LC waveguide temperature is varied.

FIG. 18 shows an example illustrating LCW throughput with and without active incoupling control when the temperature of the LC waveguide 102 is varied over a range of 20° C. When active incoupling control is not used, incoupling efficiency drops off with a FWHM of about 5° C. This is believed likely due to a combination of temperature-dependent birefringence in the LC material 110, temperature variations in the indices of the other materials in the waveguide stack, and other temperature-dependent material properties.

As was the case in compensation for mechanical and wavelength variations, the active incoupling control system and techniques were successful in maintaining good LCW throughput despite these heat-induced variations. Again, the incoupling control signal 112 voltage did not need to change by a significant amount to maintain good LCW system 100 performance.

In sum, LCW devices can benefit greatly from the addition of an active incoupling control system. This is expected to work for a variety of different types of incoupling techniques and over a significant range of input laser angles and input laser wavelengths. The technique is believed to have been experimentally proven to compensate for changes in laser angle, laser wavelength, and waveguide temperature.

The above description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Geometric terms, such as "parallel", "perpendicular", "round", or "square", are not intended to require absolute mathematical precision, unless the context indicates otherwise. Instead, such geometric terms allow for variations due to manufacturing or equivalent functions. For example, if an element is described as "round" or "generally round," a component that is not precisely circular (e.g., one that is slightly oblong or is a many-sided polygon) is still encompassed by this description.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The claimed invention is:

1. A Liquid Crystal Waveguide (LCW) system with controlled incoupling from air of incident laser light, the system comprising:
   a Liquid Crystal Waveguide (LCW), including:
   a core, arranged to receive light provided at a light input for communication toward a light output;
   a light-incoupling control electrode; and
   a Liquid Crystal (LC) material, arranged to be controlled by a control signal applied to the light-incoupling control electrode to vary a property of the LC material to adjust an incoupling from air of light incident from an input laser into the core of the LCW.

2. The LCW system of claim 1, comprising a controller circuit, configured to vary the control signal applied to the light-incoupling control electrode to vary a property of the LC material to adjust an incoupling of light into the core of the LCW to accommodate a variation in at least one of input laser light incidence angle, input laser wavelength, input laser position, LCW or input laser temperature, or input laser optical power level.

3. The LCW system of claim 1, further including a light detector sensor, coupled to an input of the controller circuit to apply the control signal to the light-incoupling control electrode to adjust incoupling of light into the core in response to light detected by the light detector sensor.

4. The LCW system of claim 3, wherein:
   the Liquid Crystal Waveguide (LCW) includes a substrate, arranged to receive light for input into the LCW; and
   the light detector sensor is arranged to detect light input into the substrate without being received by the core.

5. The LCW system of claim 3, wherein the light detector sensor is arranged to detect light guided and output by the LCW waveguide.

6. The LCW system of claim 1, wherein:
   the Liquid Crystal Waveguide (LCW) includes a subcladding arranged with respect to the core to tend to confine light within the core for communication toward the light output; and
   wherein at least one of the subcladding or the LC material includes a tapered cross-section region providing a path via which light input from the substrate passes in being communicated to the core.

7. The LCW system of claim 1, wherein the Liquid Crystal Waveguide (LCW) includes at least one of: a substrate, arranged to receive light for input into the LCW, or a subcladding, arranged with respect to the core to tend to confine light within the core for communication toward the light output; and
   wherein the LCW system includes a step-coupler including an input region providing higher relative efficiency incoupling of light into the core, and a downstream optical isolation region along a portion of the core for tending to confine light in the core for communication toward the LCW output, wherein the optical isolation region includes a lower relative efficiency incoupling than the input region.

8. The LCW system of claim 7, wherein the optical isolation region is provided by a subcladding region having a larger cross-section than a subcladding in the input region of the step-coupler.

9. The LCW system of claim 7, wherein the optical isolation region is provided by a fill region defined by the substrate, the fill region including a lower index of refraction material than a material of the substrate.

10. The LCW system of claim 1, including a diffractive grating located to provide at least partially diffractive incoupling of light into the core.

11. The LCW system of claim 1, comprising:
    a controller circuit, configured to vary the control signal applied to the light-incoupling control electrode to vary a property of the LC material to adjust an incoupling of light into the core of the LCW; and
    a temperature sensor, coupled to an input of the controller circuit to apply the control signal to the light-incoupling control electrode to adjust incoupling of light into the core in response to an indication of temperature detected by the temperature sensor.

12. The LCW system of claim 1, comprising:
    a controller circuit, configured to vary the control signal applied to the light-incoupling control electrode to vary a property of the LC material to adjust an incoupling of light into the core of the LCW; and
    wherein the controller circuit is configured for dithering light incoupled to the core for providing a signature to a lock-in amplifier.

13. The LCW system of claim 1, wherein the Liquid Crystal Waveguide (LCW), further comprises:
    a substrate, arranged to receive light for input into the LCW; and
    a subcladding, arranged with respect to the core to tend to confine light within the core for communication toward the light output.

14. A method of using a Liquid Crystal Waveguide (LCW) and controlling incoupling of light into the LCW, the method comprising:
    receiving light for input into the LCW; and
    controlling incoupling of light from air, incident from a laser beam, into the LCW, including by applying a control signal to vary a property of a Liquid Crystal (LC) material to adjust an incoupling of light from air into the LCW.

15. The method of claim 14, comprising:
    detecting an indication of light incoupling into the core; and
    using the indication of light incoupling into the core as a feedback signal for the controlling incoupling of light into a core of the LCW.

16. The method of claim 15, wherein the detecting the indication of light incoupling into the core includes detecting a light reflected without being incoupled into the core.

17. The method of claim 15, wherein the detecting the indication of light incoupling into the core includes detecting an indication of light output from the LCW.

18. The method of claim 15, comprising adjusting at least one of a laser wavelength, power, or incidence angle onto the LCW in response to the indication of light incoupling into the core.

19. The method of claim 14, wherein controlling incoupling of light into a core of the LCW includes controlling a path through a tapered cross-sectional material.

20. The method of claim 14, wherein controlling incoupling of light into the core includes varying a control signal applied to a light-incoupling control electrode to vary a property of the LC material to adjust an incoupling of light into the core of the LCW to accommodate a variation in at least one of input laser light incidence angle, input laser wavelength, LCW or input laser temperature, or input laser optical power level.

21. The method of claim 14, comprising controlling incoupling of light into the core in response to a detected temperature of at least one of the LCW or the laser.

22. The method of claim 14, wherein controlling incoupling of light into the core includes dithering light power through the LCW.

23. An apparatus for controlling incoupling of light into a Liquid Crystal Waveguide (LCW), the apparatus comprising:
  means for receiving light for input into the LCW; and
  means for controlling incoupling of light from air, incident from a laser beam, into the LCW, including by applying a control signal to vary a property of a Liquid Crystal (LC) material to adjust an incoupling of light from air into the LCW.

24. The apparatus of claim 23, comprising:
  means for detecting an indication of light incoupling into the core; and
  means for using the indication of light incoupling into the core as a feedback signal for the controlling incoupling of light into a core of the LCW.

* * * * *